(12) United States Patent
Yamaguchi

(10) Patent No.: US 6,587,223 B1
(45) Date of Patent: Jul. 1, 2003

(54) COLOR SIGNAL CONVERSION BY MEANS OF THE FEWEST CONVERTER TABLES

(75) Inventor: Takashi Yamaguchi, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/357,903

(22) Filed: Jul. 21, 1999

(30) Foreign Application Priority Data

Jul. 22, 1998 (JP) ............................................ 10-206663

(51) Int. Cl.[7] ................................................. H04N 1/46
(52) U.S. Cl. ........................................ 358/1.9; 358/525
(58) Field of Search ................................. 358/1.9, 1.14, 358/528, 518, 525

(56) References Cited

U.S. PATENT DOCUMENTS

| | | | | |
|---|---|---|---|---|
| 5,719,956 A | * | 2/1998 | Ogatsu et al. | 382/167 |
| 5,786,908 A | * | 7/1998 | Liang | 358/518 |
| 5,903,275 A | * | 5/1999 | Guay | 345/430 |
| 6,108,459 A | * | 8/2000 | Tsuji | 382/300 |
| 6,215,561 B1 | * | 4/2001 | Kakutani | 358/1.9 |

FOREIGN PATENT DOCUMENTS

| | | |
|---|---|---|
| JP | 57-13445 | 1/1982 |
| JP | 7-99587 | 4/1995 |
| JP | 7-288706 | 10/1995 |
| JP | 09-85968 | 3/1997 |
| JP | 9-216385 | 8/1997 |
| JP | 9-270932 | 10/1997 |
| JP | 10-108030 | 4/1998 |
| JP | 10-271344 | 10/1998 |

* cited by examiner

Primary Examiner—Jerome Grant, II
(74) Attorney, Agent, or Firm—Choate, Hall & Stewart

(57) ABSTRACT

A color signal converter comprises first and second color conversion tables for storing color conversion data that correspond to different external conditions; and a color conversion table data interpolation section for generating, based on color conversion data outputted from the first and second color conversion tables and external conditions, color conversion data for image generation that correspond to external conditions. In the event of change in the external temperature conditions, a color conversion table is generated by interpolating the first and second color conversion tables, which are provided for different conditions, according to the current external temperature conditions. Color reproducibility is thus unaffected by external conditions and optimum color conversion can always be achieved.

23 Claims, 23 Drawing Sheets

COLOR SIGNAL CONVERSION BY MEANS OF THE FEWEST CONVERTER TABLES

BACKGROUND OF THE INVENTION

1. Field of the Invention

The present invention relates to a color signal conversion method and color signal converter for color image printing.

2. Description of the Related Art

In the field of color image printing and color hard copy, color signal conversion from the three primary colors of light (RGB) to the three primary colors of color (CMY) has been indispensable when reproducing color by a printer.

In regard to the actual ink, however, there has been the problem that color conversion cannot be carried out simply because other colors are mixed in the ink. A three-dimensional interpolation using various color conversion tables has been proposed as a way of quickly and easily converting color signals.

The three-dimensional interpolation is a method of carrying out color conversion in color space in which three-dimensional color space is divided equally into n units in each direction of RGB so as to subdivide one RGB color space into n×n×n units. By subdividing color space in this way, color can be handled as a linear form in color space, thereby shortening the amount of time necessary for calculation compared with the case in which color does not change linearly and simplifying the calculation itself.

As shown in FIGS. 1a–1d, each interpolation calculation is carried out in 4-point, 5-point, 6-point, and 8-point interpolations using data of four to eight apices, respectively.

FIGS. 1a–1d each show only one unit of a cube that has been cut into a number of units in each interpolation, each interpolation actually cutting a cube into four to eight unit cubes.

Three-dimensional interpolation calculation thus finds the current pixel data through linear interpolation using the four to eight points of apex data of the subdivided color space that contains the points currently being sought.

These interpolations divide three-dimensional color space represented by three primary colors into a plurality of color cube units, and within the color cube units, linear interpolation is carried out with color assumed to change linearly, thereby enabling fast and easy conversion of color signals.

A color signal converter of the prior art is disclosed in Japanese Patent Laid-open No. 99587/95. As shown in FIG. 2a, this converter comprises picture element input section 100, comparator 102, adder 101, addrress generator 103, color conversion table memory 105, selector 107, weitht generator 103, oblique triangular column determination section 104, and oblique triangular column interpolation calculator 109.

Picture element input section 100 inputs and divides RGB color image signals into higher-order bits(RH,GH,BH) and lower-order bits(RL,GL,BL). Comparator 102 compares the lower-order bits with themselves and outputs the compared results. Adder 101 adds the output of comparator 102 to that of picture element section 100. Address generator 103 generates from the outputs of both picture element input section 100 and comparator 102. Color conversion table memory 105 stores color conversion data for converting RGB to CMYK. Selector 107 selects the output of the color conversion table memory 105. Weight generator 108 generates, from the lower-order bits, weight coefficients for interpolation points. Oblique triangular column determination section 104 determines the size of the weight coefficients and selects oblique triangular column made up of apices of each unit cubes which are obtained by dividing three primary color spaces into a plurality of unit cubes. Oblique triangular column interpolation calculator 109 interpolates output values read from color conversion table memory 105 using the weight coefficients.

In this way, the color signal converter of the prior art effects color conversion by linear interpolation in a state free of ripple (a phenomenon in which false contours are generated by interpolation) in all color space.

FIG. 2b is a simplified block diagram of FIG. 2a.

As shown in FIG. 2b, when RGB signals are received in pixel input section 100, the section 100 separates an RGBH signal for selecting color conversion table memory 105 and an RGBL signal for controlling oblique triangular column interpolation calculator 109. Address generator 103 generates from the RGBH signals memory address signals for selecting a memory address in color conversion table memory 105. Color conversion data that are specified by the addresses of the memory address signals are outputted from color conversion table memory 105. Upon receipt of color conversion data signals and RGBL signals, oblique triangular column interpolation calculator 109 carries out an interpolation calculation of color conversion data signals and outputs interpolation calculation data signals, which are the calculation results of interpolating the color conversion data signals.

Another color signal converter of the prior art is disclosed in Japanese Patent Laid-open No. 288706/95. As shown in FIG. 3, this converter comprises first color reproduction area table 150, second color reproduction area table 124, color reproduction area conversion section 121, entire corresponding color decision section 122, optimum color reproduction area selecting section 123, target color reproduction area by k-ink amount table 126, color area reproduction area dividing section by k-ink amount 125, entire corresponding ink amount storage memory 127, candidate selection section 128, interpolation calculation section 129. First color reproduction area table 120 stores RGB values. Second color reproduction area table 124 stores CMYK values. Color reproduction area conversion section 121 performs conversion of source representative color signals (RGB values) while varying the RGB values outputted from first color reproduction area table 120. Entire corresponding color decision section 122 searches target color reproduction area by K-ink amount table 126 and finds a set of CMYK ink amounts corresponding to the converted color signals. Optimum color reproduction area conversion selecting section 123 finds the optimum values of RGB values in color reproduction area conversion section 121. Target color reproduction area by K-ink amount table 126 stores data obtained by colorimetring color samples of a plurality of colors obtained by adjusting CMY ink amounts for a plurality of different K-ink amounts. Color reproduction area dividing section by k-ink amount 125 divides color reproduction area table by K-ink amount 126 into independent color reproduction area tables for each K-ink amount. Entire corresponding ink amount storage memory 127 stores one or more sets of CMYK ink amounts obtained by the optimum conversion RGB values. Candidate selecting section 128 selects one or two sets of CMYK ink amounts in accordance with K-ink amount adjustment coefficient. Interpolation calculation section 129 carries out interpolation calculation with K-ink amount adjustment coefficients as an internal division ratio to calculate CMYK ink amounts.

Thus, in the color signal converter of the prior art, CMYK ink amounts corresponding to any color of a color image display device are determined based on actual measurement data; and K-ink amounts are selected based on K-ink amount adjustment coefficients. Moreover, the CMYK ink amounts are selected with K-ink amount adjustment coefficients, and the CMYK ink amount in each K-ink amount is determined.

In the converter disclosed in Japanese Patent Laid-open No. 99587/95 has the following problems. These color conversion data are produced under a certain condition, so that color conversion data corresponding to the external temperature conditions are compelled to be rewritten to color conversion table memory 105 in the event of a change in the external temperature.

Furthermore, because especially in an ink-jet printer, ink spray conditions change according to the temperature of the ink or the amount of time the printer is used, and hence color reproducibility is decreased, color conversion data that correspond to current conditions are forced to be rewritten to color conversion table memory 105.

Moreover, large variations in color may occur after rewriting, resulting in variations in color reproducibility.

The converter disclosed in Japanese Patent Laid-open No. 288706/95 has the following problems. The converter uses a plurality of different tables of K-ink amounts for color conversion, finds the optimum ink amounts from target color reproduction area table by K-ink amount 126, and performs color conversion by interpolation calculation. To perform color conversion with this method, however, the color signal converter needs a large number of target color reproduction area by K-ink amount tables 126, and thus entails increased circuit scale.

In addition, changes in external condition necessitate either rewriting to target color reproduction area by K-ink amount table 126 or preparing in advance tables for every external temperature.

SUMMARY OF THE INVENTION

It is an object of the present invention to provide a color signal conversion method and color signal converter that can perform optimum color conversion with the smallest possible construction without decreasing color reproducibility despite changes in external conditions.

According to one aspect of the present invention, a color signal converter comprises first and second conversion tables and a color conversion interpolation section.

In a preferred embodiment, the first and second color conversion tables stores color conversion data for converting from RGB, which are the three primary colors of light, to CMY, which are three primary colors of color. The color conversion table interpolation section generates, based on external conditions and color conversion data outputted from the first and second color conversion tables, color conversion data signals for image generation.

In the event of change in the external conditions, a color conversion table that corresponds to the change in external conditions is generated by interpolating two color conversion tables for different conditions in accordance with the current external conditions. As a result, optimum color conversion can always be achieved without affecting color reproducibility by external conditions.

In addition, color interpolation according to the current external conditions realizes good color reproduction.

Moreover, the use of only two color conversion tables enables the capacity of memory for color conversion table to be decreased to a minimum. To attain good color reproducibility according to external conditions, a large number of color conversion tables must be provided for different external conditions and then switched or rewritten data in color conversion tables as necessary. With this invention, however, good color reproduction can be achieved by using a minimum of, i.e., only two color conversion tables for different external conditions.

No color shifts occur because the two color conversion tables are not switched or rewritten based on external conditions. Whereas large shifts in color may occur when switching or rewriting color conversion data in color conversion tables to guarantee good color reproducibility. Color shifts do not occur in this embodiment as changes in external conditions are adjusted by interpolation.

According to another aspect of the present invention, a color signal converter comprises a first color conversion table, a second color conversion table, a third color conversion table, a color conversion data selector, and a color conversion table data interpolation section.

In a preferred embodiment, the first color conversion table stores color conversion data for low external conditions. The second color conversion table stores color conversion data for high external conditions. The third color conversion table stores color conversion data for an intermediate condition between high and low external conditions. The color conversion data selector selects, according to external conditions, two color conversion data signals from three color conversion data signals outputted from the first to third color conversion tables, and outputs the selected color conversion data signals. The first and third color conversion tables are selected if the external condition is between the first temperature stored in the first color conversion table and the second temperature stored in the third color conversion table, and the second and third color conversion tables are selected if the external condition is between the third temperature stored in the second color conversion table and the second temperature stored in the third color conversion table. The color conversion table data interpolation section generates, based on external conditions and the two color conversion data signals outputted from the color conversion data selector, color conversion data signals for image generation that correspond to external conditions.

In the event of change in the external conditions a color conversion table is generated that corresponds to the change in external conditions by interpolating data in the three color conversion tables for different conditions in accordance with the current external conditions. As a result, optimum color conversion can always be achieved without affecting color reproducibility by external conditions.

Further, the use of only three color conversion tables enables the capacity of memory for color conversion table to be decreased to a minimum. To attain good color reproducibility according to the external conditions, a large number of color conversion tables must be provided for different external conditions and then switched or rewritten data in color conversion table as necessary. The present invention, however, can achieve good color reproduction by using a minimum of, i.e., only three color conversion tables for different external conditions.

Finally, no color shifts occur because the three color conversion tables are not switched and rewritten based on external conditions. While large color shifts may occur when switching or rewriting color conversion tables to guarantee good color reproducibility, color shifts do not occur in this embodiment as changes in external conditions are adjusted by interpolation.

The above and other objects, features, and advantages of the present invention will become apparent from the following description with reference to the accompanying drawings which illustrate examples of the present invention.

BRIEF DESCRIPTION OF THE DRAWINGS

FIG. 2b is a simplified block diagram of FIG. 2a;

FIG. 8b shows the internal construction of color conversion table data interpolation section implemented the concept of primary linear interpolation shown in FIG. 8a;

DETAILED DESCRIPTION OF THE PREFERRED EMBODIMENTS

Although the following explanation takes temperature as an external condition, which can be considered as the most changeable factor, the invention is not limited to temperature, and includes humidity and air pressure.

Figure 1A:
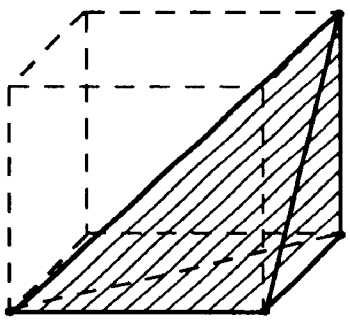
FIGS. 1a–1d show a 4-point interpolation, 5-point interpolation, 6-point interpolation, and 8-point interpolation, respectively.
Figure 1B:
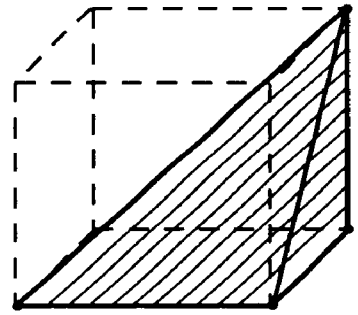
Figure 1C:
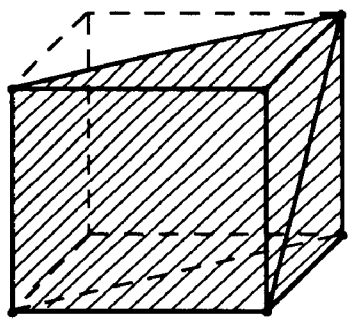
Figure 1D:
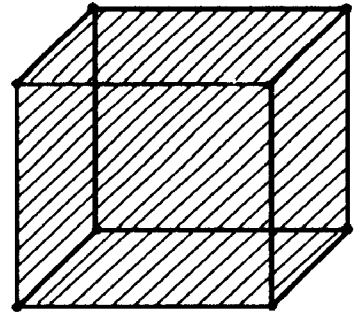
Figure 2A:
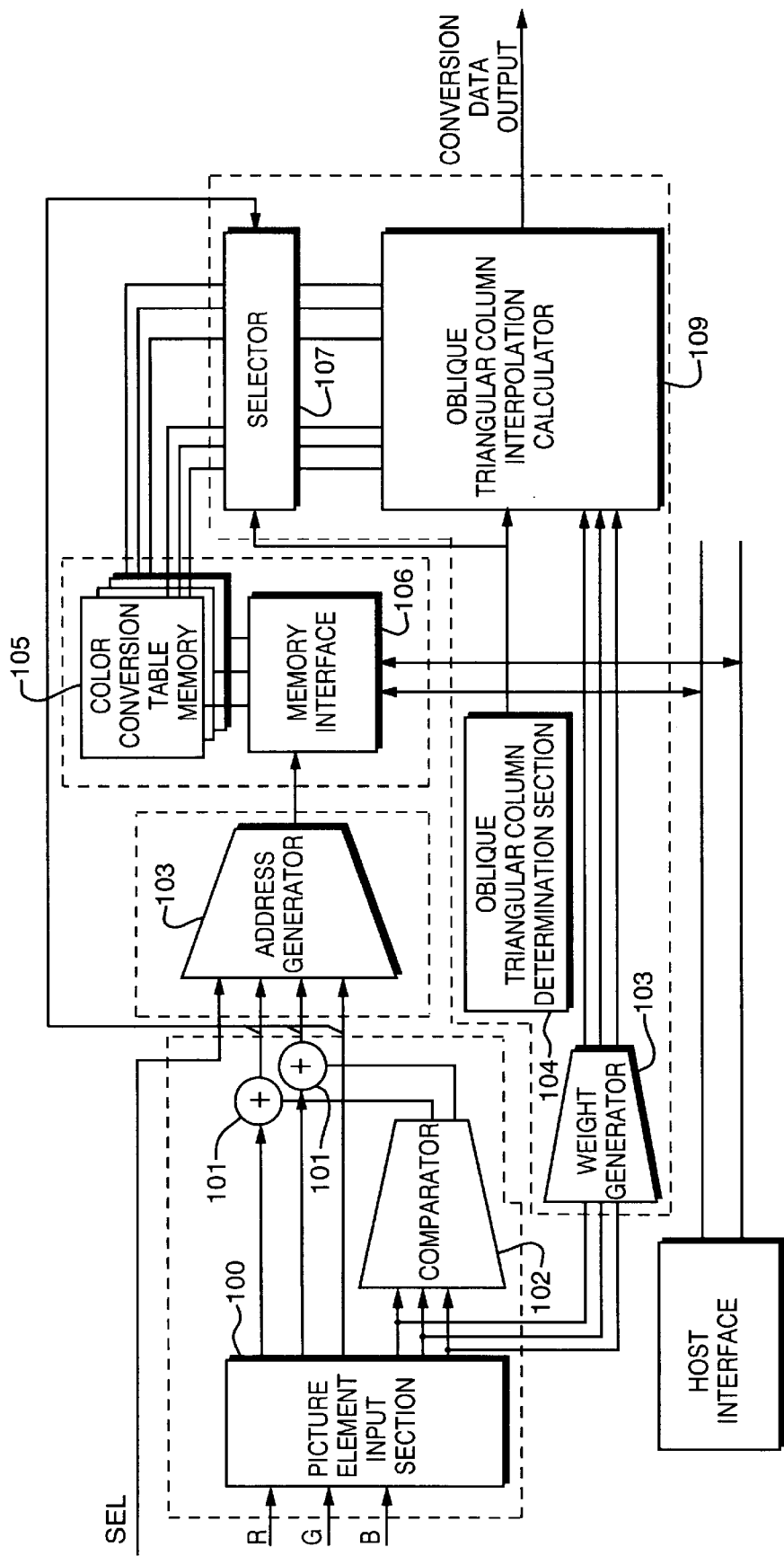
FIG. 2a shows a block diagram of a color signal converter according to an example of the prior art.
Figure 2B:
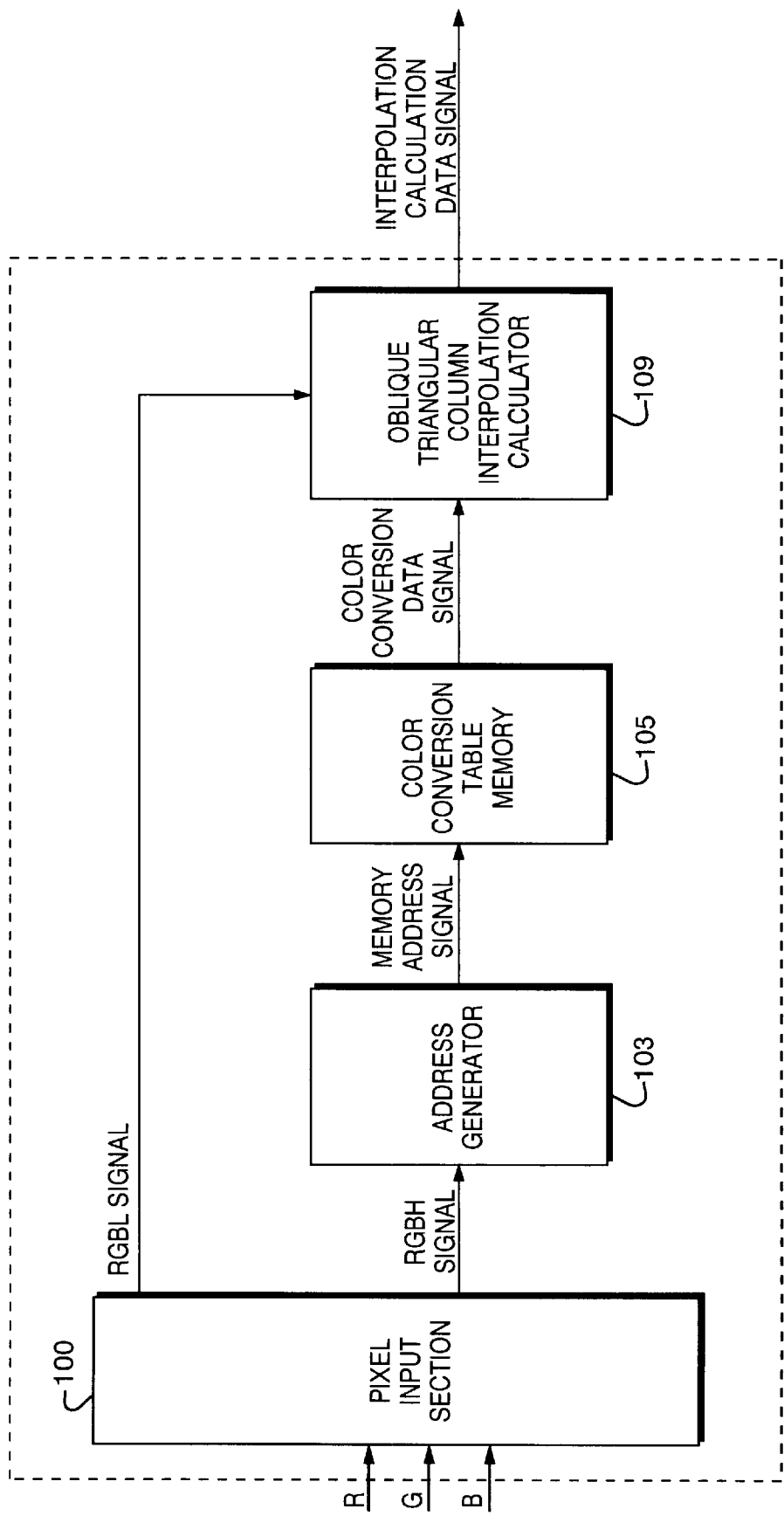
Figure 3:
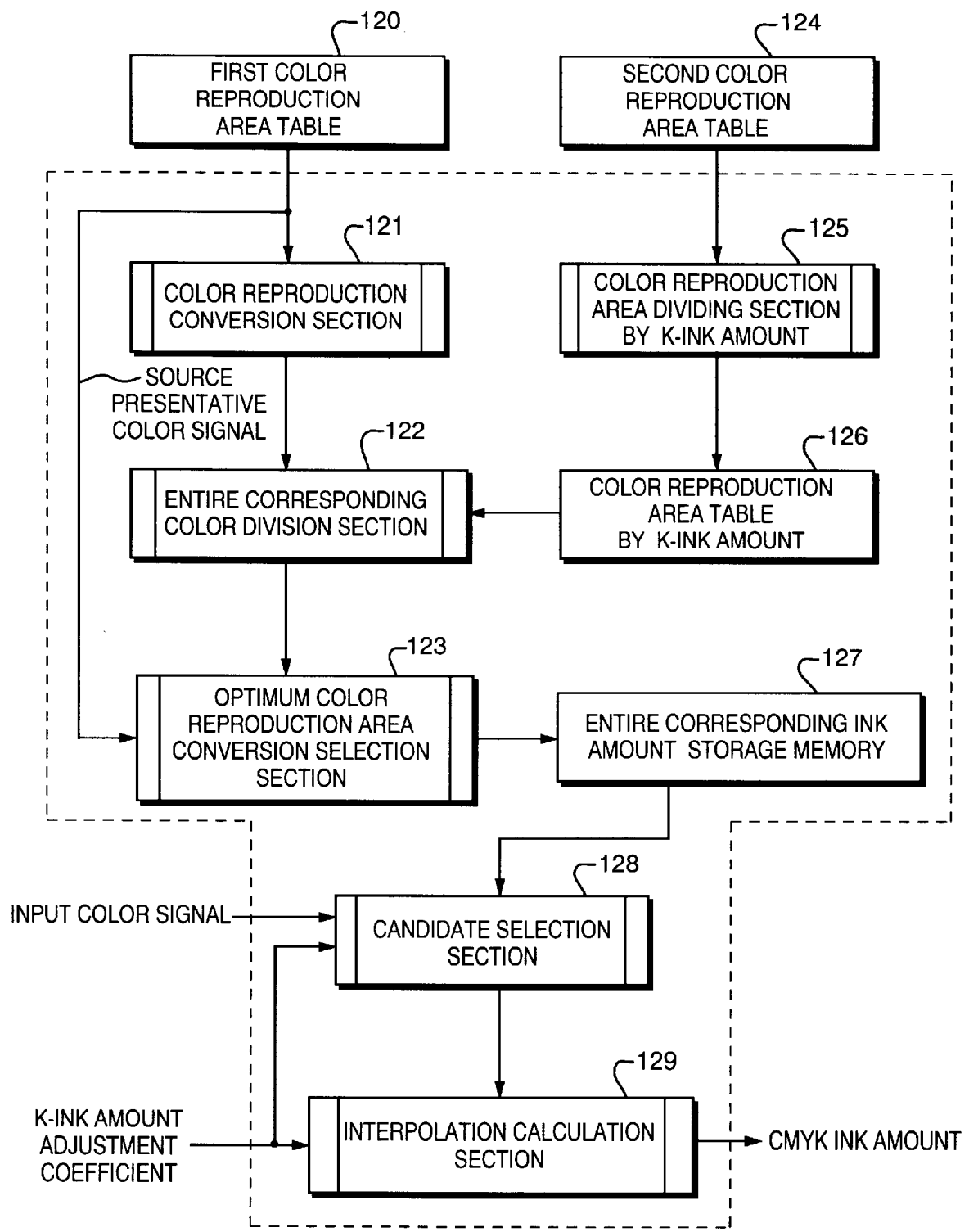
FIG. 3 shows a block diagram of a color signal converter according to another example of the prior art.
Figure 4:
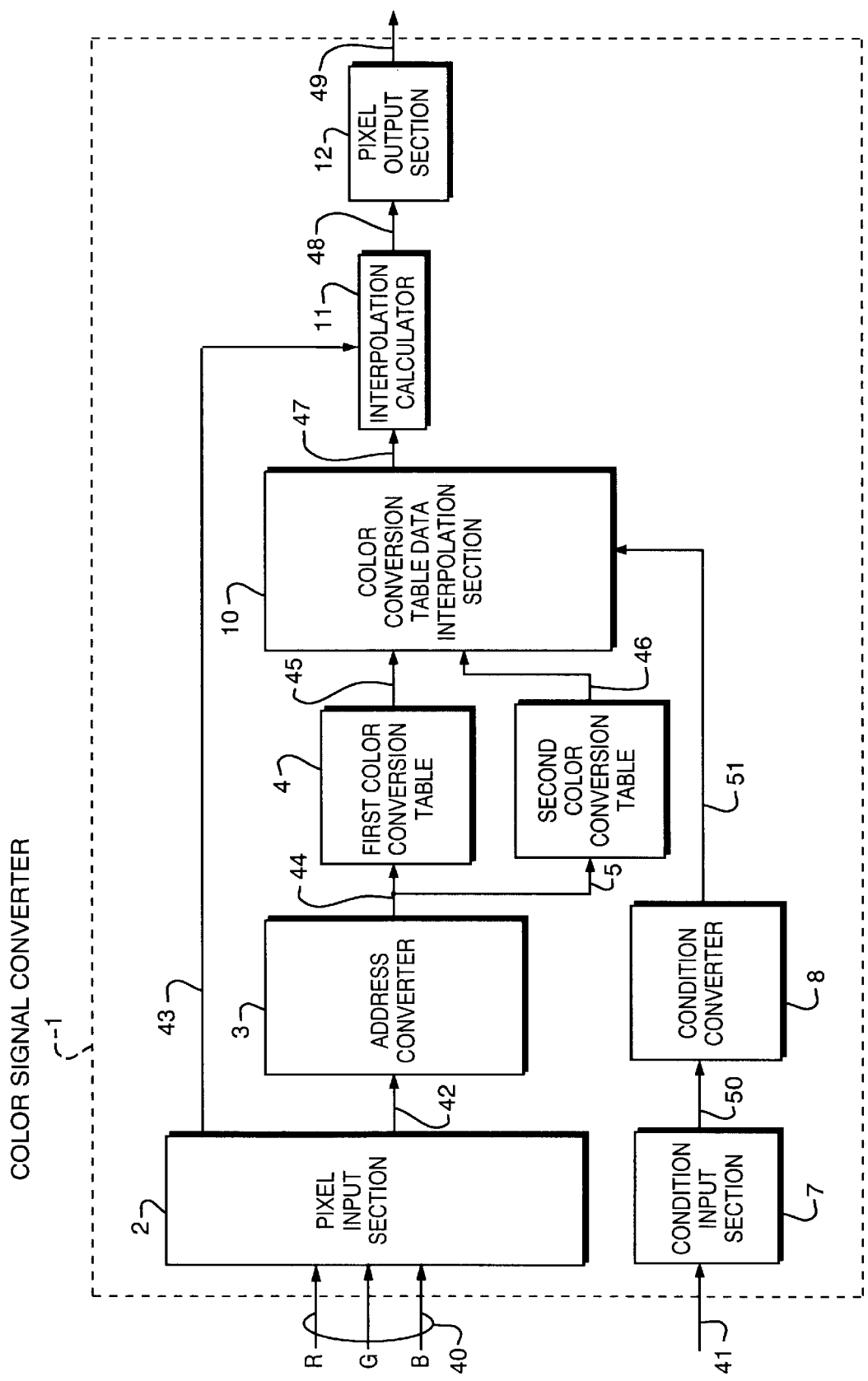
FIG. 4 shows a block diagram of the construction of a color signal converter according to a first embodiment of the present invention.

Referring now to FIG. 4, there is shown a color signal converter according to the first embodiment of the present invention which comprises pixel input section 2, first color conversion table 4, second color conversion table 5, condition input section 7, condition converter 8, color conversion table data interpolation section 10, and interpolation calculator 11.

Pixel input section 2 separates RGB signal into RGBH signal 42, which is the higher-order bits of RGB signal 40, and RGBL signal 43, which is the lower-order bits of RGB signal 40. First color conversion table 4 stores color conversion data for a low external temperature. Second color conversion table 5 stores color conversion data for a high external temperature. Address converter 3 receives RGBH signal 42 from image input section 2 and generates addresses for data stored in first and second color conversion tables 4 and 5. Condition input section 7 receives condition signal 41 indicating the external temperature and outputs the signal as condition signal 50. Condition converter 8 generates, from condition signal 50 received from condition input section 7, condition-interpolation control signal 51 for performing condition-interpolation corresponding to the external temperature. Color conversion table data interpolation section 10 executes, in accordance with condition-interpolation control signal 51, interpolation calculations for color conversion data received from first and second color conversion tables 4 and 5 and generates first color conversion data signal 47 that corresponds to the current external temperature inputted from condition converter 8. Interpolation calculator 11 carries out an interpolation calculation of first color conversion data signal 47 generated at color conversion table data interpolation section 10 in accordance with RGBL signal 43, which is a data signal for interpolation calculation. Pixel output section 12 outputs second color conversion data signal 48 from interpolation calculator 11 to the outside as image data signal 49.

Figure 5:
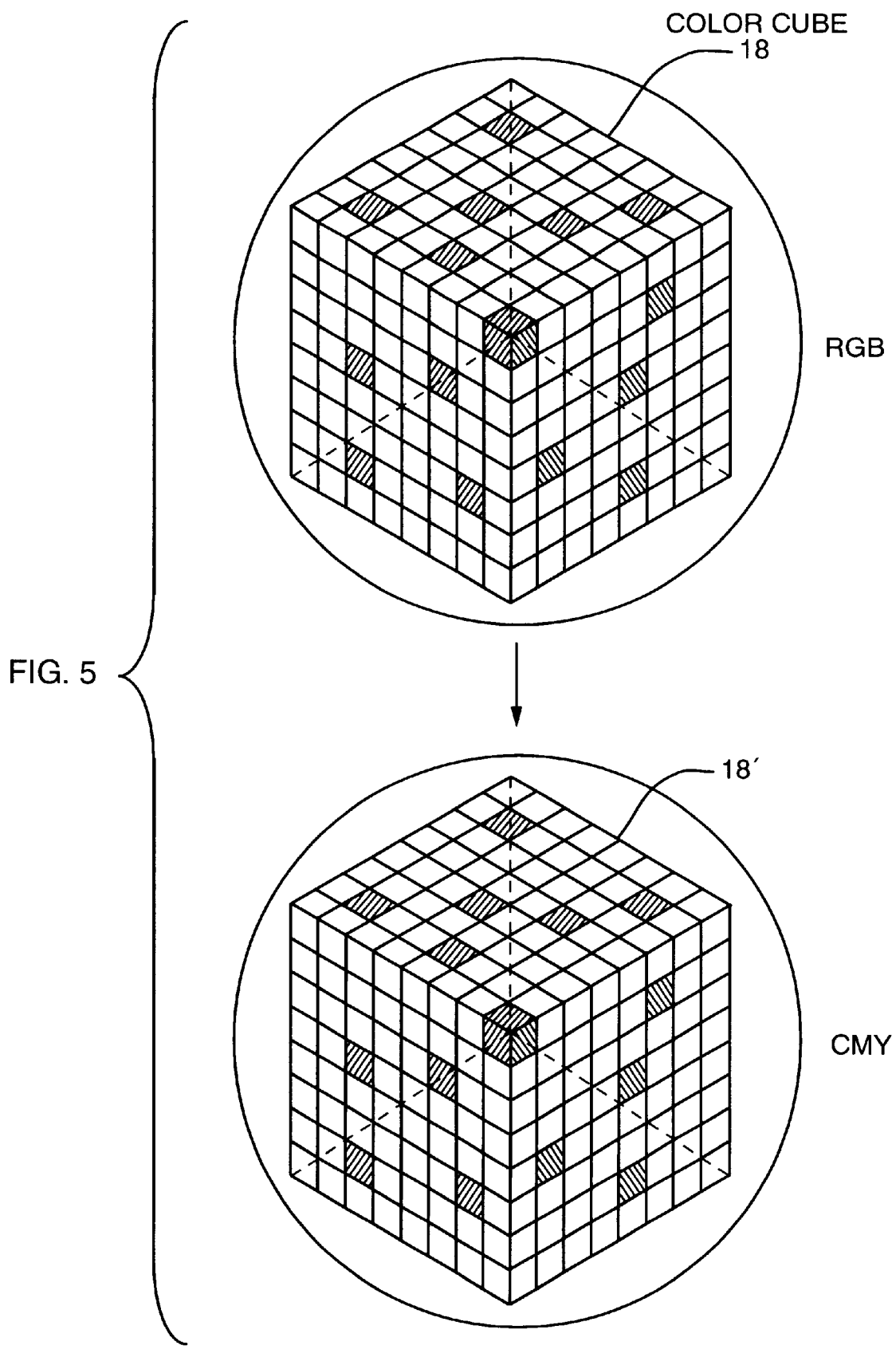
FIG. 5 shows a schematic view of the basic idea of the present invention, which is the conversion from the three primary colors of light (RGB) to the three primary colors of color (CMY)

This embodiment is basically used for color printing or producing color hard copy in a color printer such as an ink-jet printer or a laser printer, and as shown in FIG. 5, is intended for converting color cube 18 of the three primary colors of light (RGB) into color cube 18' of the three primary colors of color (CMY), i.e., for space conversion.

The present embodiment takes into consideration color reproducibility under various external temperatures i.e., temperature changes such as the change in temperature of the head (not shown) of a color printer. Color conversion data at an external temperature of 10° C. are stored in first color conversion table 4, and color conversion data at an external temperature of 70° C. are stored in second color conversion table 5, assuming that the external temperature may change from 10° C. to 70° C. Color conversion data between these two temperatures are calculated from the external temperature and data stored in color conversion tables 4 and 5.

Figure 6A:
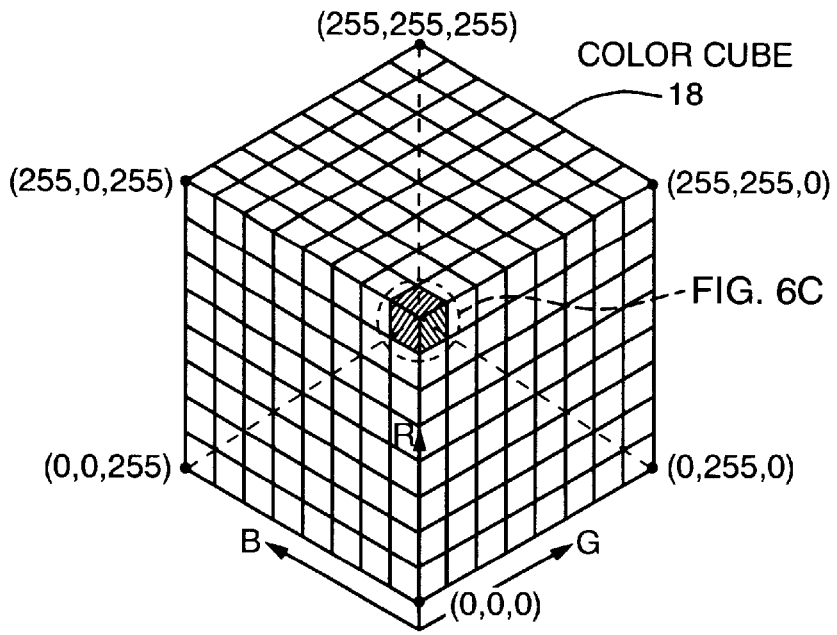
FIG. 6a shows a view in which the first and second color conversion tables are represented as a color cube and a color cube unit.
Figure 6C:
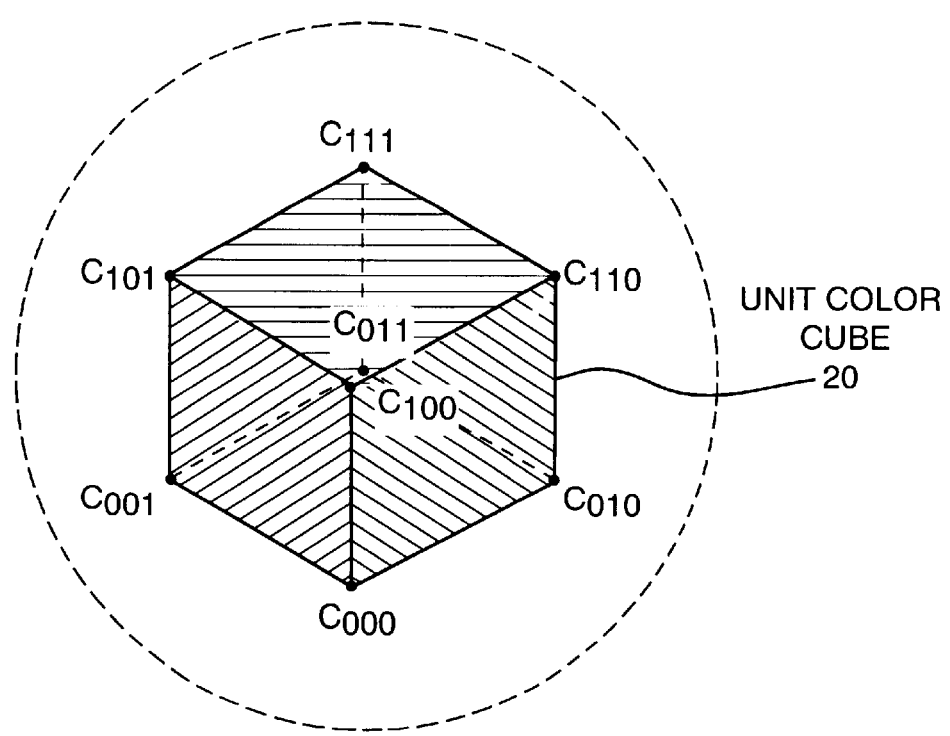
FIG. 6c is a more detailed view of a unit color cube shown FIG. 6A.

As shown in FIG. 6a, in both first and second color conversion tables 4 and 5, the three-primary-color RGB space is represented by color cube 18 which is made up of color cube units 20 formed by equally dividing each side of RGB into 8 equal parts. In this example, color cube 18 is made up of 8×8×8=512 color cube units 20, and color conversion data for converting RGB to CMY are placed at the apices C000–C111 of each of these color cube units 20.

As described above, first and second color conversion tables 4 and 5 are both expressed by color cube 18. However, color cube 18 is a mere imaginary expression, and actual table does not take such a form. It served as an exhibition of an image of color conversion data stored in first and second color conversion tables 4 and 5.

Figure 6B:
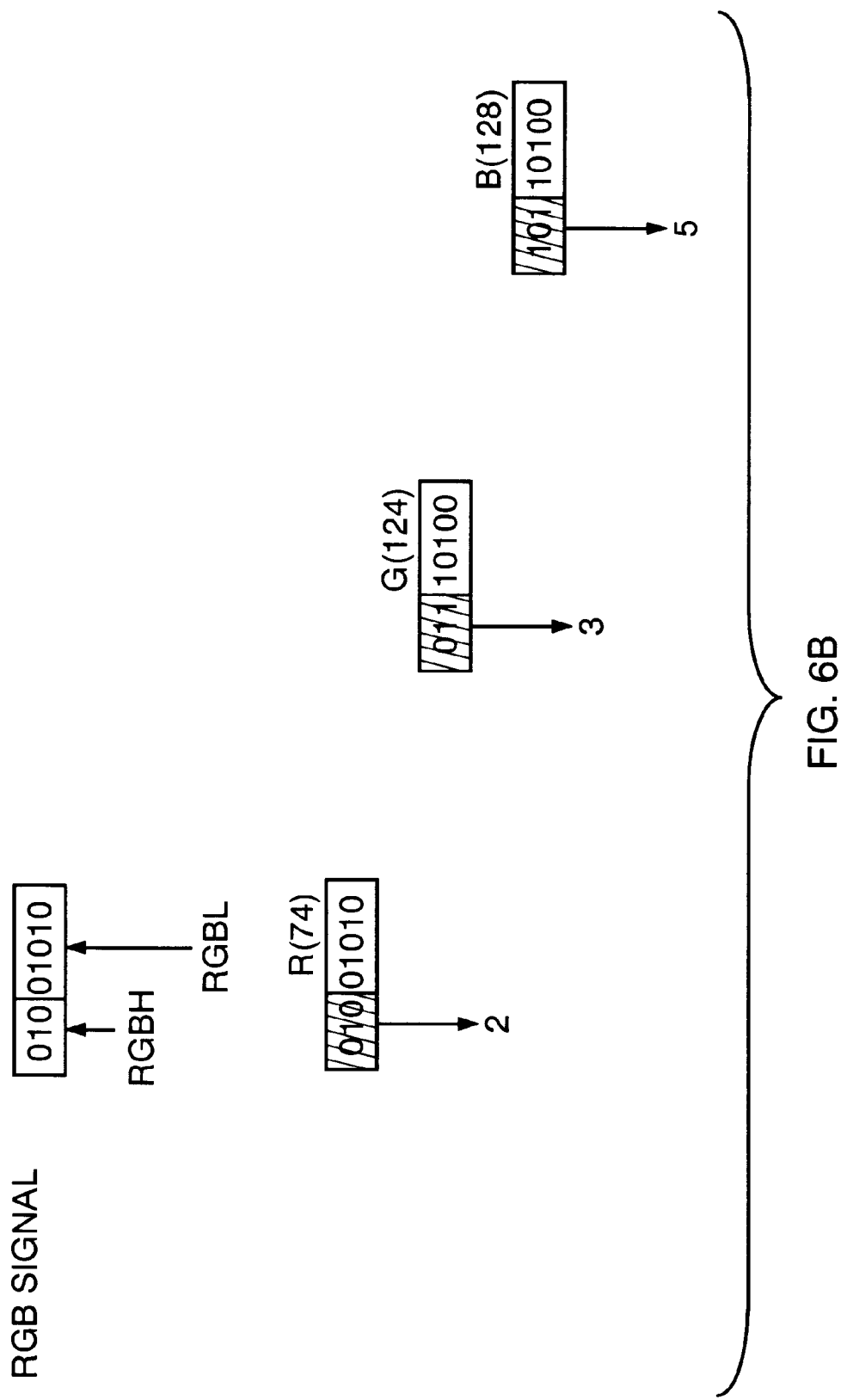
FIG. 6b shows the method of generating addresses of the first and second color conversion tables.

An example of address generation will be described with reference to FIG. 6b. If RGB signal 40 is, for example, 01001010, 01111100, 10110100 ((74, 124, 80) in decimal notation) as shown in FIG. 6b, 010, 011, 101 (RGB being (2,3,5) in decimal notation) are extracted as RGBH signal 42, which is the three higher-order bits of RGB signal 40. This RGBH signal 42 is supplied to first and second color conversion tables 4 and 5 as address signal 44, based on which color conversion data placed at each of apices C000–C111 of color cube unit 20 are read out.

Temperature control is indispensable in a color printer that adds color by fixing four-color ink on paper. For example, an ink-jet printer performs printing by applying heat or pressure to the printer head to spray liquid ink. A change in the temperature of the head at this time undergoes a change in flowability of the ink, which affects an influence on the characteristic of ink spreading on the paper. The head becomes particularly hot in a printer that employs heat for spaying ink. The temperature of the head also rises with the application of pressure in a printer that employs pressure for spraying ink. In contrast, a laser printer, which uses high temperature to fix ink to the paper suffers a smaller change in temperature in a laser printer as compared with an ink-jet printer. However, the condition of the adherence of the ink varies as a consequence of the inability to fix ink at a uniform temperature. This embodiment uses two color conversion tables to deal with this type of change in external temperatures. The construction of the two color conversion tables is the same, but as mentioned above, the tables have different color conversion data.

Two color conversion tables 4 and 5 store ink color conversion data that have been obtained through experience at the low external temperature and the high external temperature. Accordingly, color conversion from RGB to CMY is possible as long as the external temperatures are within the temperature range of color conversion tables 4 and 5. However, to provide color conversion tables for every external temperature as in the prior art, will increase the number of color conversion tables enormously, which needs a large capacity of memory to store the color conversion data. In addition, repeated rewriting to the color conversion tables is required every time the external temperature change, thus causing shifts in color.

Each of the three higher-order bits of RGB express an address of first and second color conversion tables 4 and 5. As shown in FIG. 6a, first and second color conversion tables 4 and 5 can represent RGB within the range of 0 to 255, and a total of 729 points of color conversion data can thus be stored in color cube 18. Color conversion data should be placed to facilitate output of color conversion data to color conversion table data interpolation section 10.

As an example, the method of placing color conversion data according to the following equation can be considered as the simplest method:

$$Ta = ((Rh \times 9) + Gh) \times 9) + Bh \quad (1)$$

where Ta is the color conversion table address and Rh, Gh, and Bh are the three higher-order bit data.

Figure 7A:
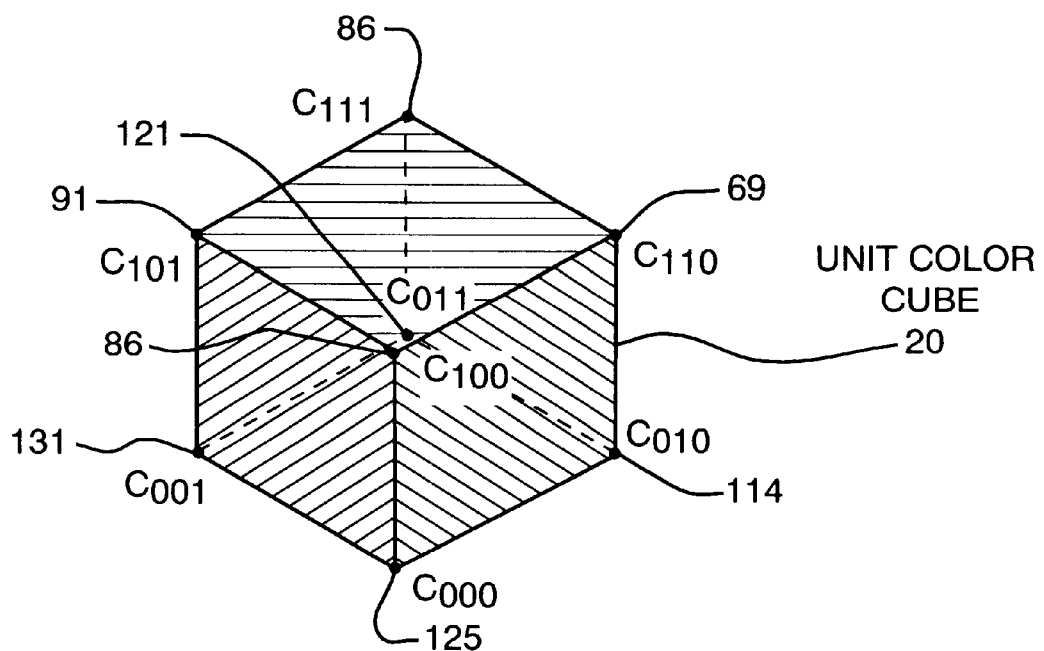
FIG. 7a shows color conversion data placed at each apex of the first color conversion table.
Figure 7B:
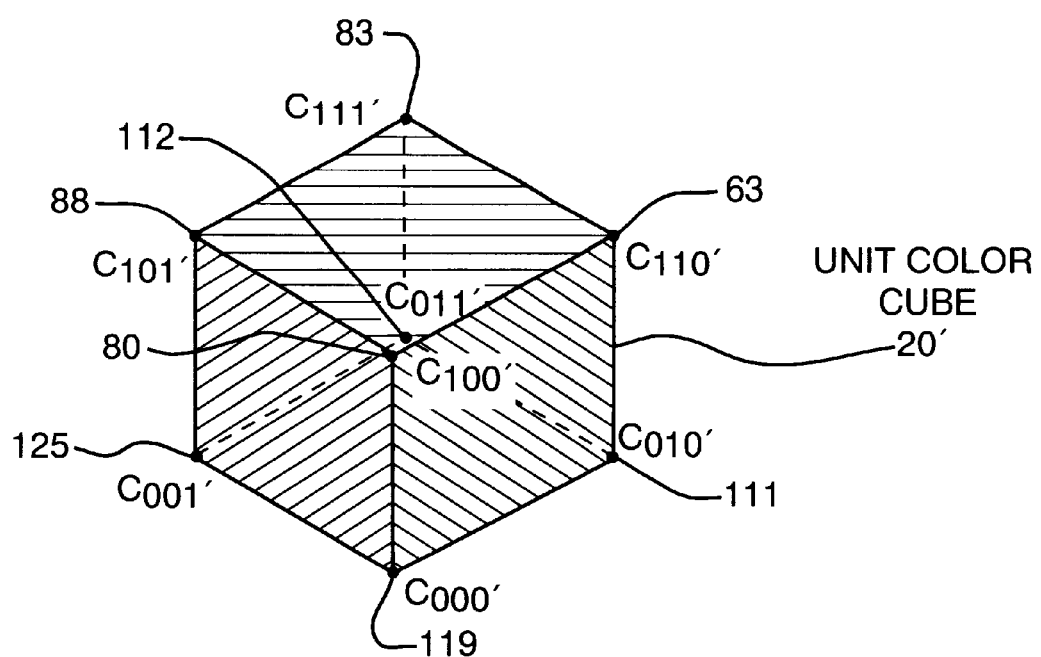
FIG. 7b shows color conversion data placed at each apex of the second color conversion table.

FIGS. 7a and 7b show the placement of color conversion data at each of the apices C000–C111 and C000'–C111' of color cube units 20 and 20' to first and second color conversion tables 4 and 5. FIG. 7a is the color conversion data stored in first color conversion table 4, and FIG. 7b is the color conversion data stored in color conversion table 5.

Figure 8A:
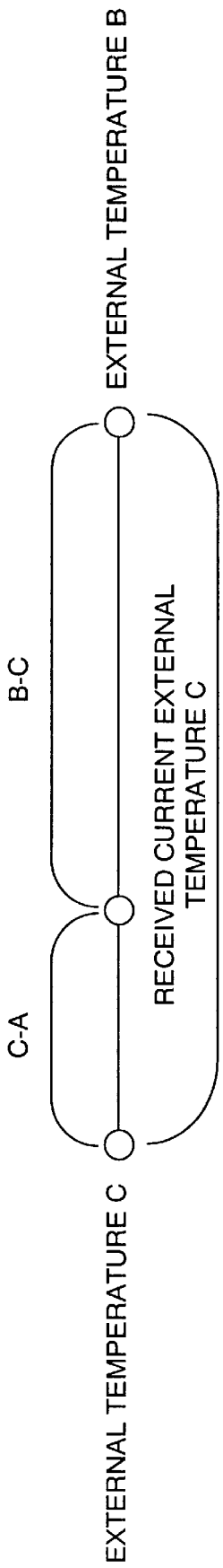
FIG. 8a shows the concept of primary linear interpolation.

In FIG. 8a, the received current external temperature C changes, for example, from external temperature A stored in first color conversion table 4 to external temperature B stored in second color conversion table 5, and moreover, changes linearly within this range. If the current external temperature C deviates from external temperature A by a value indicated by condition-interpolation control signal 51 outputted from condition converter 8, color conversion table data interpolation section 10 executes the primary linear interpolation represented by the following equation:

first color conversion data 47=(condition-interpolation control signal 51/N)×color conversion data 46+((N-condition-interpolation control signal 51)/N)×color conversion data 45 (2)

Where N is the difference between A (highest temperature) and B (lowest temperature).

Figure 8B:
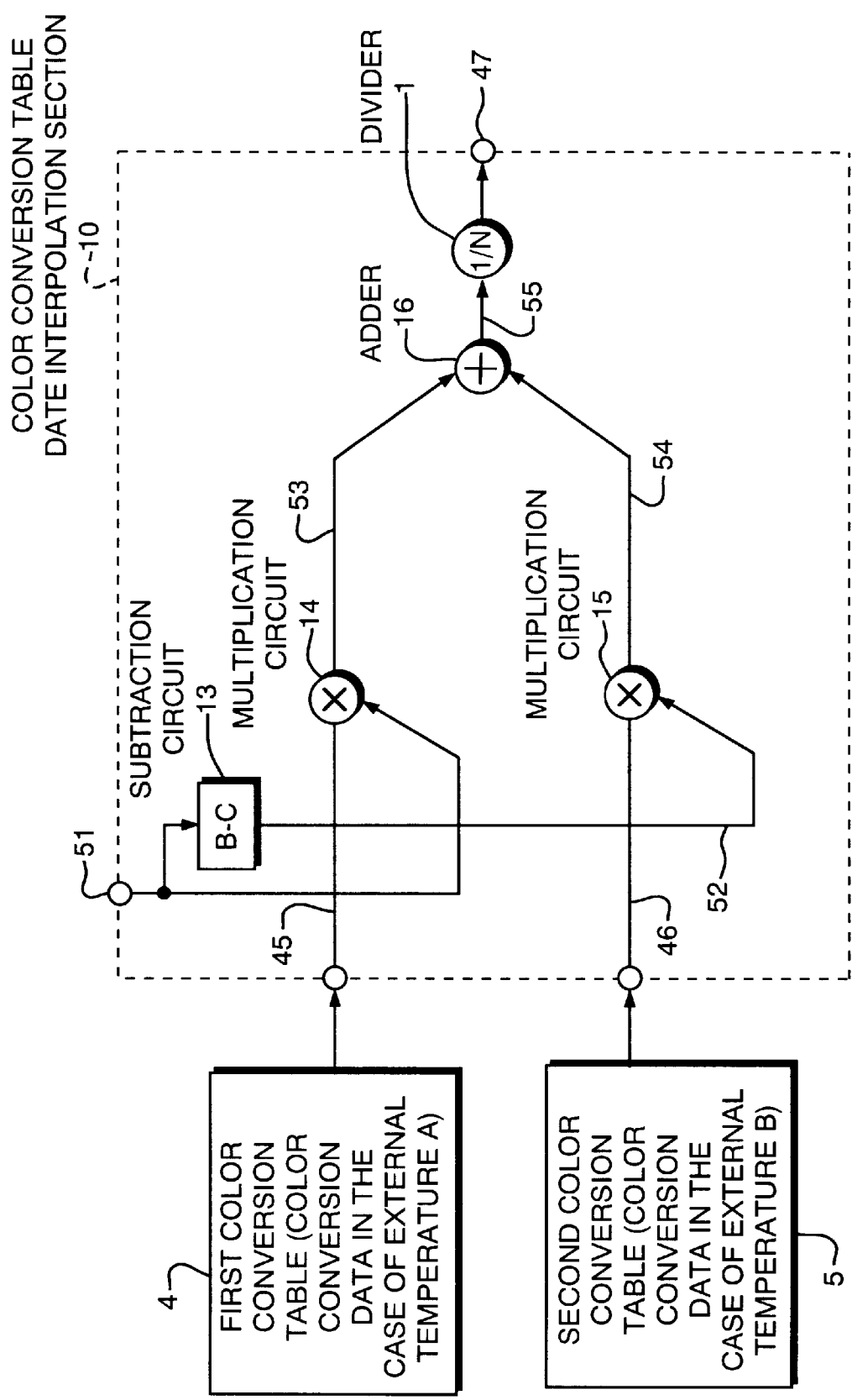

As shown in FIG. 8b, color conversion table data interpolation section 10 comprises subtraction circuit 13, multiplication circuits 14 and 15, adder 16, and divider 17.

As described above, since addresses of color conversion tables 4 and 5 are given by the three higher-order bits of RGB signal 40, address of first and second color conversing tables 4,5 can be easily generated by extracting the three higher-order bits of RGB signal 40 and employing a simple circuit configuration of adders and shift operations.

Subtraction circuit 13 is supplied with condition-interpolation control signal 51 at current external temperature of C and outputs differential data signal 52 to indicate how external temperature C deviates from external temperature B. Multiplication circuit 14 multiplies condition-interpolation control signal 51 by color conversion data signal 45 to output calculated signal 53. Similarly, multiplication circuit 15 multiplies differential data signal 52 by color conversion data signal 46 to output calculated signal 55. Adder 16 adds calculated signals 53 and 54 together to output added signal 55. Divider 17 divides the output of adder 16 by N(=B−A) to generate color conversion data signal 47 at the current external temperature.

If, for example, color conversion data 70 and 10, which are read from first and second color conversion tables 4 and 5 at 30° C., are substituted in equation (2):

first color conversion data 47=(30−10)/(70−10)×color conversion data 46+((70−10)−(30−10))/(70−10)×color conversion data 45)

Color cube unit 20 that takes as its point of origin (2, 3, 5) of the RGB coordinates of color cube 18 of first and second color conversion tables 4 and 5 is selected, and color conversion data signal 45 placed at each of the apices C000–C111 of the selected color cube unit 20 is read out.

Figure 9A:
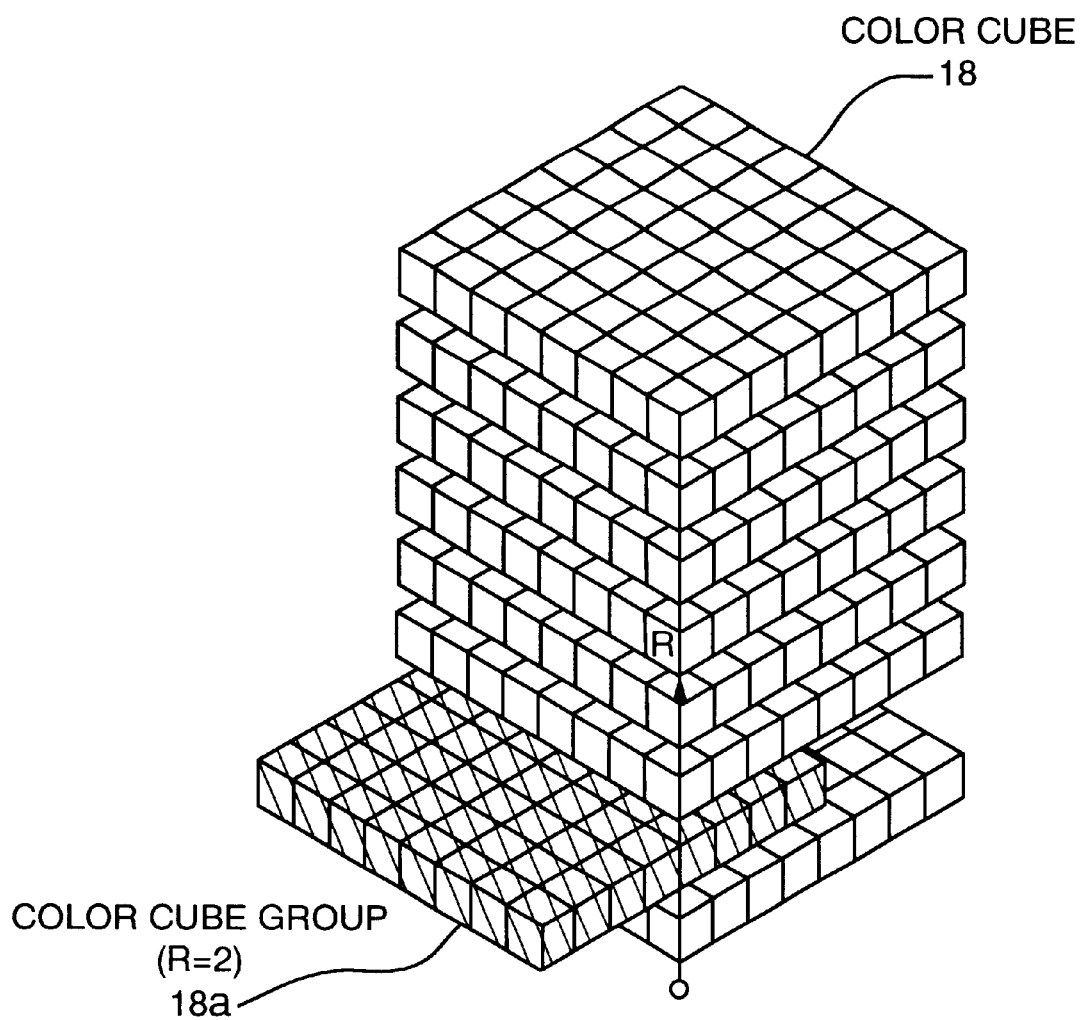
FIG. 9a shows the selection of a cube group R made up of color cube units.

FIG. 9a shows the selection of Red color cube group 18a (R=2) made up of the color cube units that are second from the bottom of color cube 18.

Figure 9B:
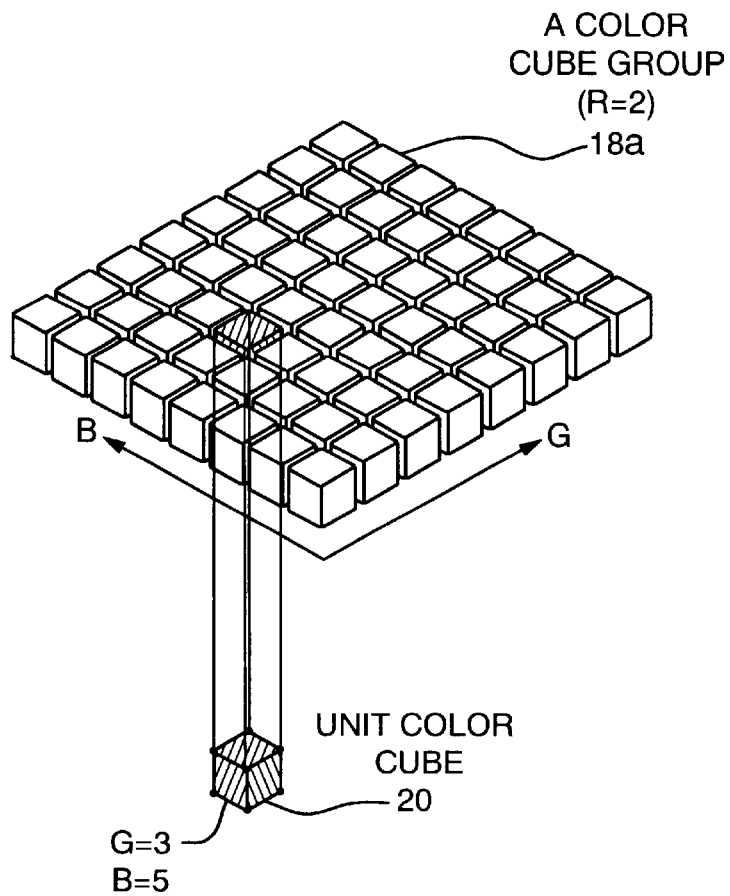
FIG. 9b shows the selection of a color cube unit based on color cubes G and B.
Figure 9C:
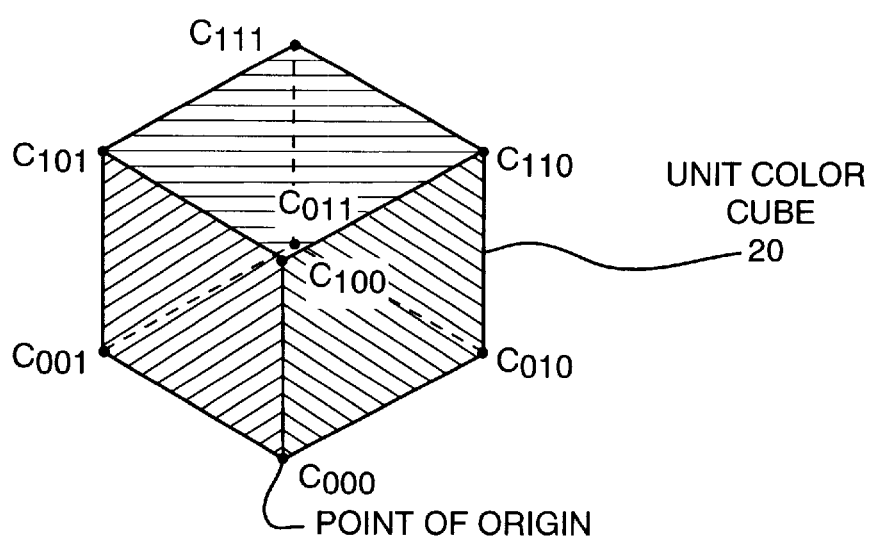
FIG. 9c shows a color cube unit.
Figure 10:
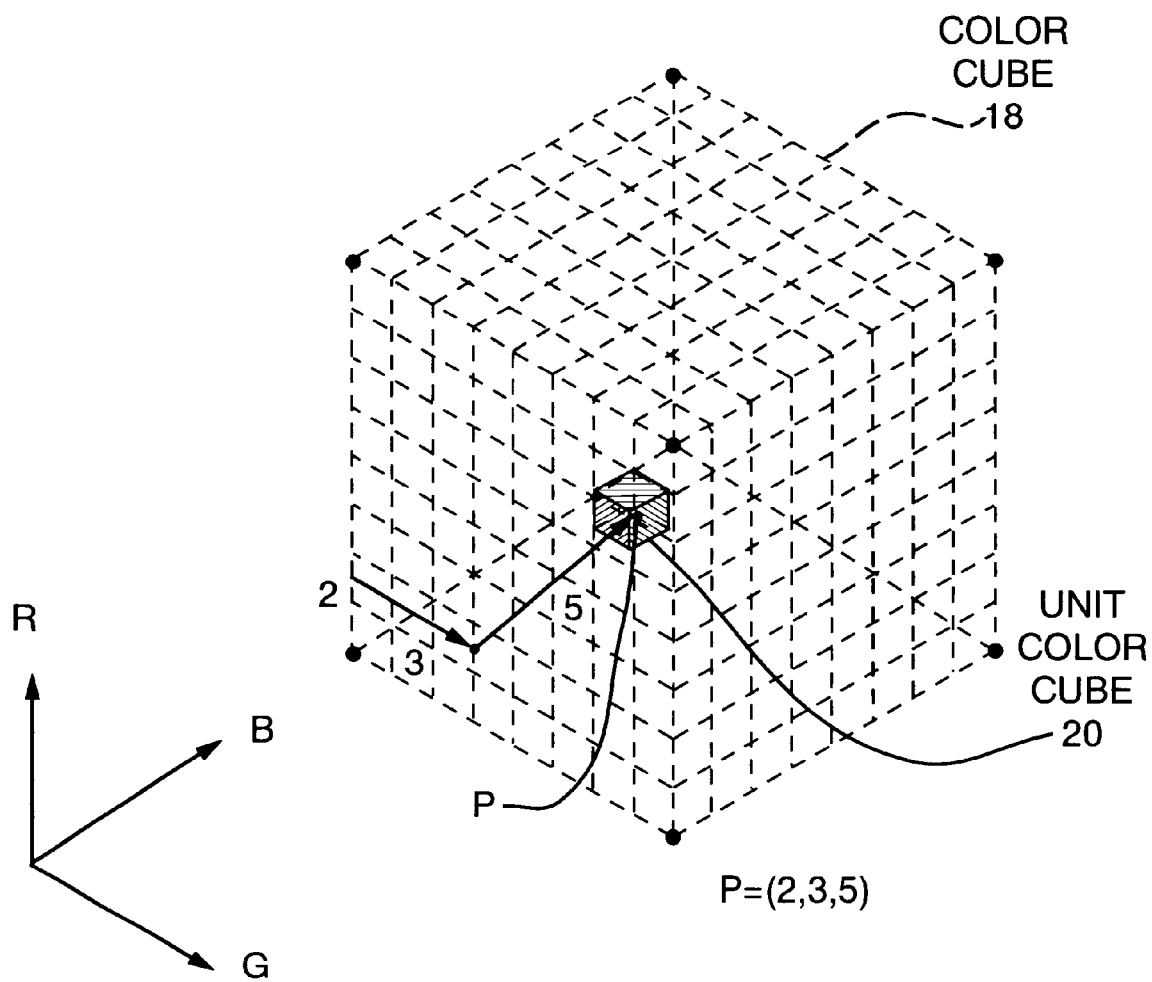
FIGS. 10 shows the summary of the address generation method shown in FIGS. 9a–9c.

FIG. 9b shows the selection of the target color cube unit 20 from among color cube group 18 a (R=2) based on G and B. Since G is 3 and B is 5, color cube unit 20 at that position is selected from color cube group 18 a as shown in FIG. 9b, and as shown in FIG. 9c, the color conversion data placed at each of the apices C000–C111 of selected color cube unit 20 are read out and supplied to color conversion table data interpolation section 10 as color conversion data signal 45. As shown in FIG. 9c, C000 is the point of origin of color cube unit 20. FIG. 10 shows the summary of operations shown in FIGS. 9a–9c. As shown in FIG. 10, color cube unit 20 at the coordinate (2, 3, 5) of first and second color conversion tables 4 and 5 is accessed, and the color conversion data placed at each of the apices C000–C111 are read out.

The address designation of first color conversion table 4 shown in FIGS. 9a, 9b is also applied to the address designation for second color conversion table 5.

Color cube unit 20, which takes as its point of origin the coordinates (2, 3, 5) of color cube 18, is thus selected in address converter 3 in accordance with RGBH signal 42, and color conversion data signal 47 (see FIG. 4) corresponding to each of the apices C000–C111 of the selected color cube unit 20 is supplied to interpolation calculator 11. This color conversion data signal 47 is applied to interpolation calculator 11, an interpolation calculation is carried out in accordance with RGBL signal 43 separated at pixel input section 2, and color conversion data signal 48 is generated. The required number of data items varies depending on what kind of interpolation interpolation calculator 11 is implemented, but in this case, for example, an 8-point interpolation calculation is carried out using all of the eight apices C000–C111 of color cube unit 20. Data contained in Table 1 are placed at each of the apices of each of the color cube units of first and second color conversion tables 4 and 5.

TABLE 1

The following 8-point primary interpolation (also called cubic interpolation) equation is used to find the addresses C000–C111 of each of the color cube unit apices shown in Table 1 that are necessary for the interpolation calculation at interpolation calculator 11:

C000 = (((Rh × 9) + Gh) × 9) + Bh
C001 = (((Rh × 9) + Gh) × 9) + (Bh + 1)
C010 = (((Rh × 9) + (Gh + 1) × 9) + Bh
C011 = (((Rh × 9) + (Gh + 1) × 9) + (Bh + 1)
C100 = (((Rh + 1) × 9) × Gh) × 9) × Bh
C101 = (((Rh + 1) × 9) × Gh) × 9) × (Bh + 1)
C110 = (((Rh + 1) × 9) + (Gh + 1)) × 9) + Bh
C111 = (((Rh + 1) × 9) + (Gh + 1)) × 9) + (Bh + 1)
(4)

First color conversion data signal 47 that corresponds to the current external temperature (30° C.) outputted from color conversion table data interpolation section 10 using equation to yield Table 2.

TABLE 2

Interpolation calculator 11 carries out an 8-point interpolation calculation using RGBL signal 43 separated from RGB signal 40 at pixel input section 2 and first color conversion data signal 47 obtained by color conversion table data interpolation section 10. If RGB signal 40 is 01001010, 01111100, 10110100 ((74, 124, 128) in decimal notation) as shown in FIG. 6b, RGBL signal 43 of the five lower-order bits extracted from RGB signal 40 is 01010, 11100, 10100, ((10, 28, 20) in decimal notation).
At this time, interpolation calculator 11 calculates the following 8-point interpolation equation using the color conversion data of each of the apices C000–C111 of Table 1. Carries out the calculation of equation (5), and discards all digits to the right of the decimal point to yield Table 3.

color conversion data 48 =
(1 − x) (1 − y) (1 − z) C000 + x (1 − y) (1 − z)
C100 + (1 − x) (1 − y) z C001 + x (1 − y) z C101 +

TABLE 2-continued

Interpolation calculator 11 carries out an 8-point interpolation calculation using RGBL signal 43 separated from RGB signal 40 at pixel input section 2 and first color conversion data signal 47 obtained by color conversion table data interpolation section 10. If RGB signal 40 is 01001010, 01111100, 10110100 ((74, 124, 128) in decimal notation) as shown in FIG. 6b, RGBL signal 43 of the five lower-order bits extracted from RGB signal 40 is 01010, 11100, 10100, ((10, 28, 20) in decimal notation).
At this time, interpolation calculator 11 calculates the following 8-point interpolation equation using the color conversion data of each of the apices C000–C111 of Table 1. Carries out the calculation of equation (5), and discards all digits to the right of the decimal point to yield Table 3.

(1 − x) y (1 − z) C010 + xy (1 − z) C110 + (1 − x)
yz C011 + xyz C111            (5)

If RGB input data is equal to or less than 223 (the three higher-order bits of RGB signal 40 are 000–110), x=the five lower-order bits of R/32, y=the five lower-order bits of G/32, and z=the five lower-order bits of B/32 where 0<x, y, and z <1.

If the RGB input data is equal to or greater than 224 (the three higher-order bits of RGB signal 40 are 111), x=the five lower-order bits of R/31, y=the five lower-order bits of G/31, and z=the five lower-order bits of B/31, where 0<x, y, z<1.

Next, an 8-point interpolation will be explained with reference to FIGS. 11a and 11b.

The 8-point interpolation is a method of approximating target pixels by means of cubic interpolation and called an $8^{th}$-order linear multinomial equation.

Figure 11A:
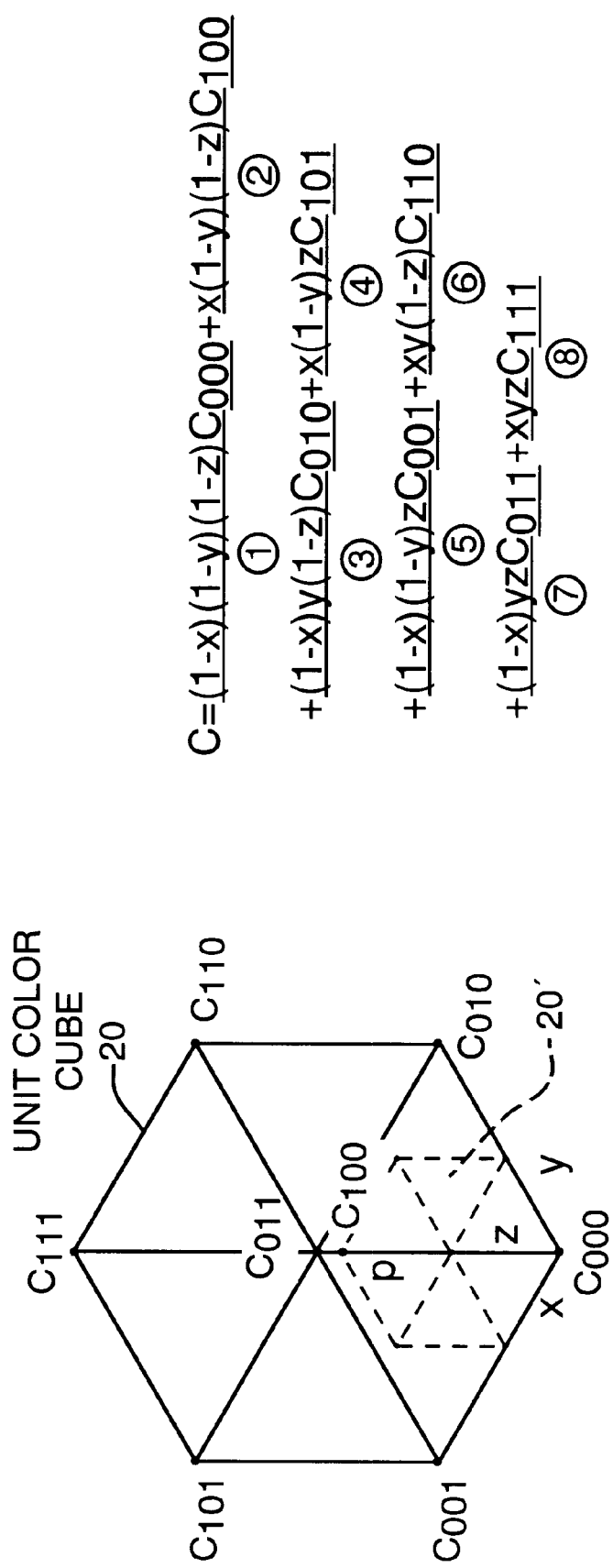
FIG. 11a shows 8-point interpolation.

Assuming that an 8-point interpolation equation consisting of eight terms is given as shown in FIG. 11a. In FIG. 11a, the apex P of color cube 20' contained in color cube unit 20 is the target pixel to be sought.

Figure 11B:
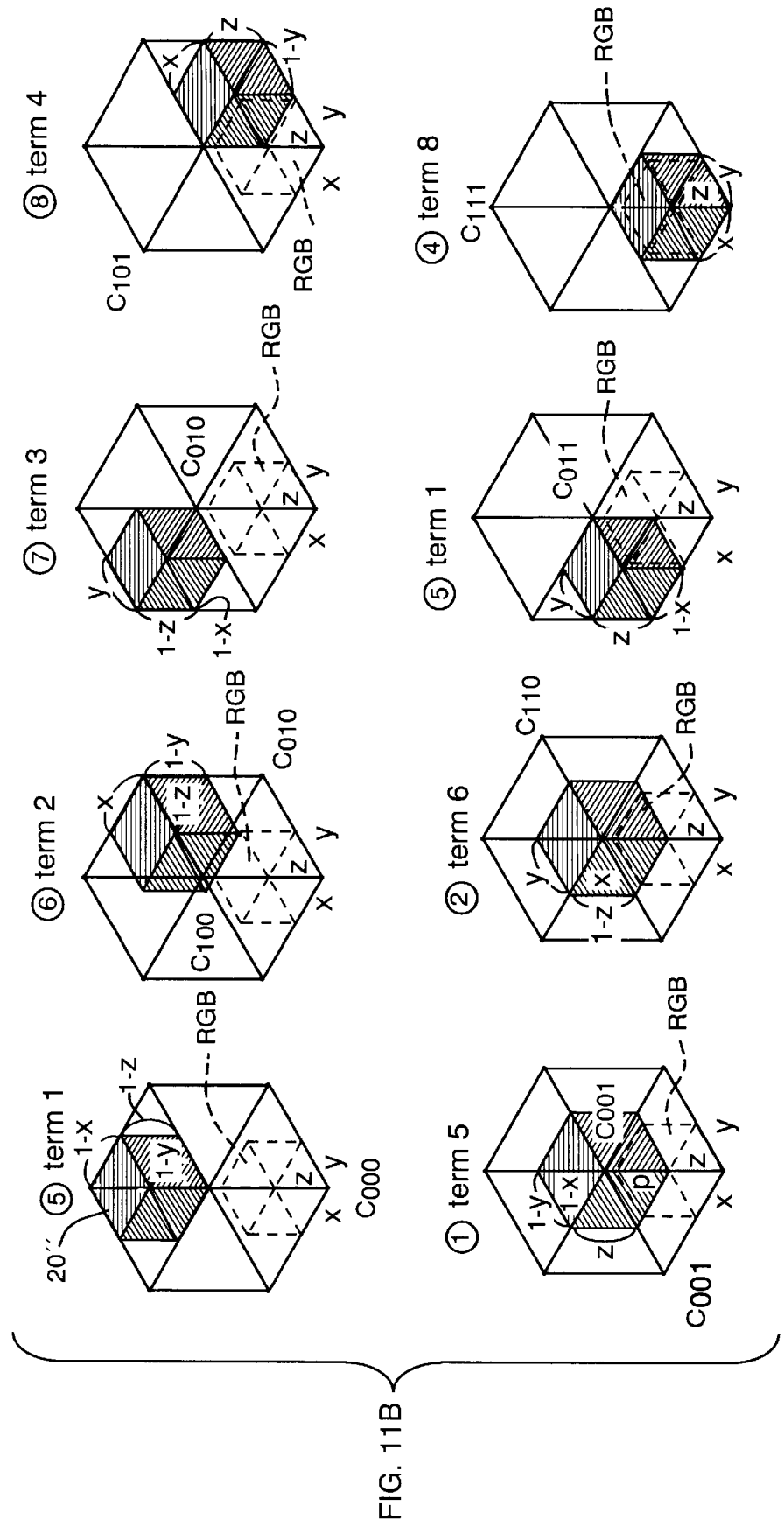
FIG. 11b is a schematic view decomposing each term of 8-point interpolation.

FIG. 11b shows a schematic representation of the 8-point interpolation equation of FIG. 11a decomposed to each term.

As shown in FIG. 11b, the periphery of color cube 20' that contains the target pixel P is interpolated by interpolation cube 20'', and the approximate color conversion data can be found by successively adding up terms (1)–(8) regardless of which interpolation zone of color cube 20 contains pixel P.

In the case of a target pixel P stands at apex C1000, values of other terms that contain the remaining apices of the 8-point interpolation equation become zero after interpolation calculation. Thus, when target pixels are on each apex, they affect no influence on the calculation result, otherwise they do.

TABLE 3

In this way, second color conversion data signal 48 that corresponds to the current external temperature is generated by interpolation calculator 11 and outputted to the outside as image data signal 49 by way of pixel output section 12.

Figure 12:
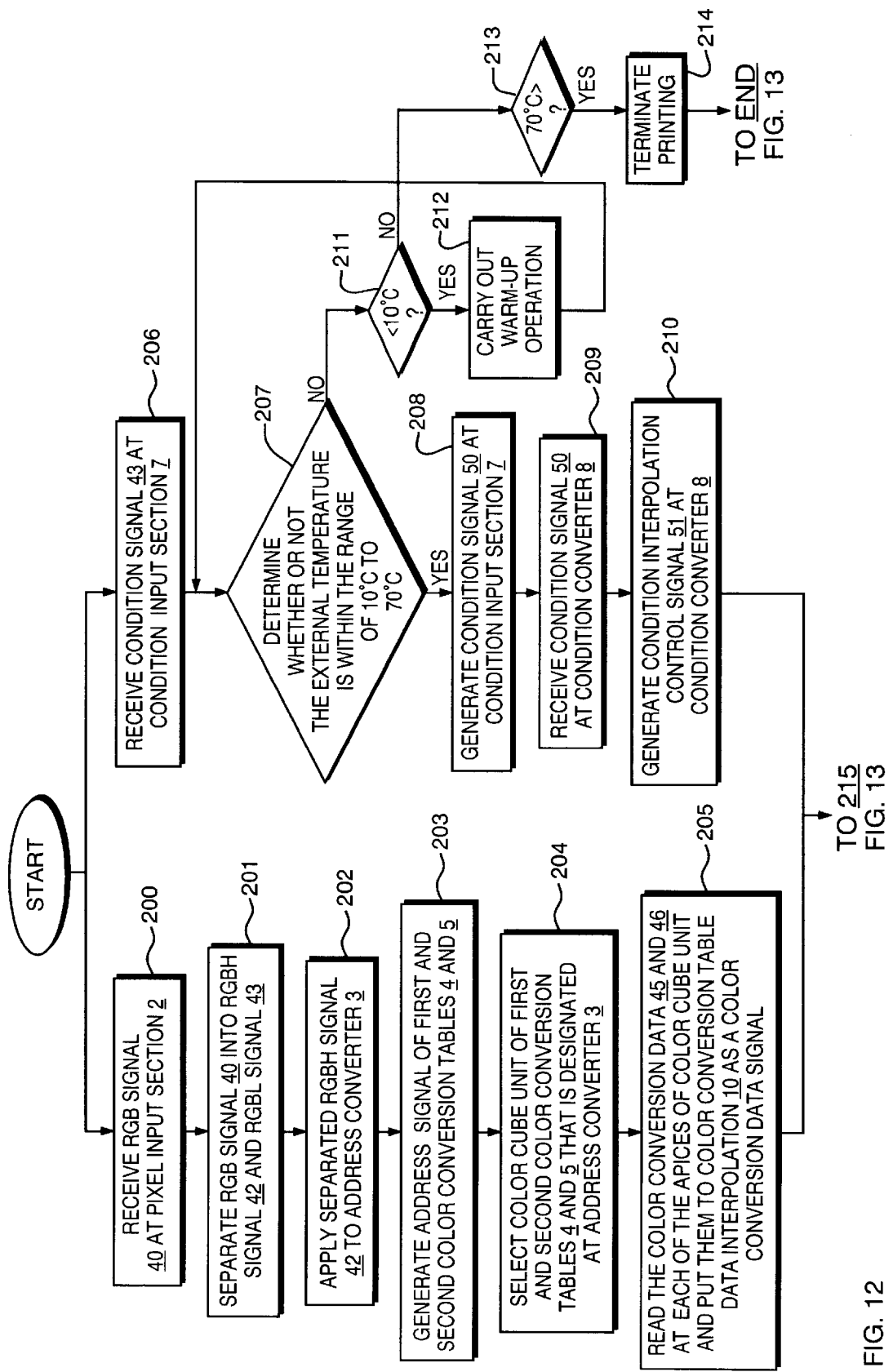
FIG. 12 shows a detailed flow chart of the operation of the first embodiment of the present invention.
Figure 13:
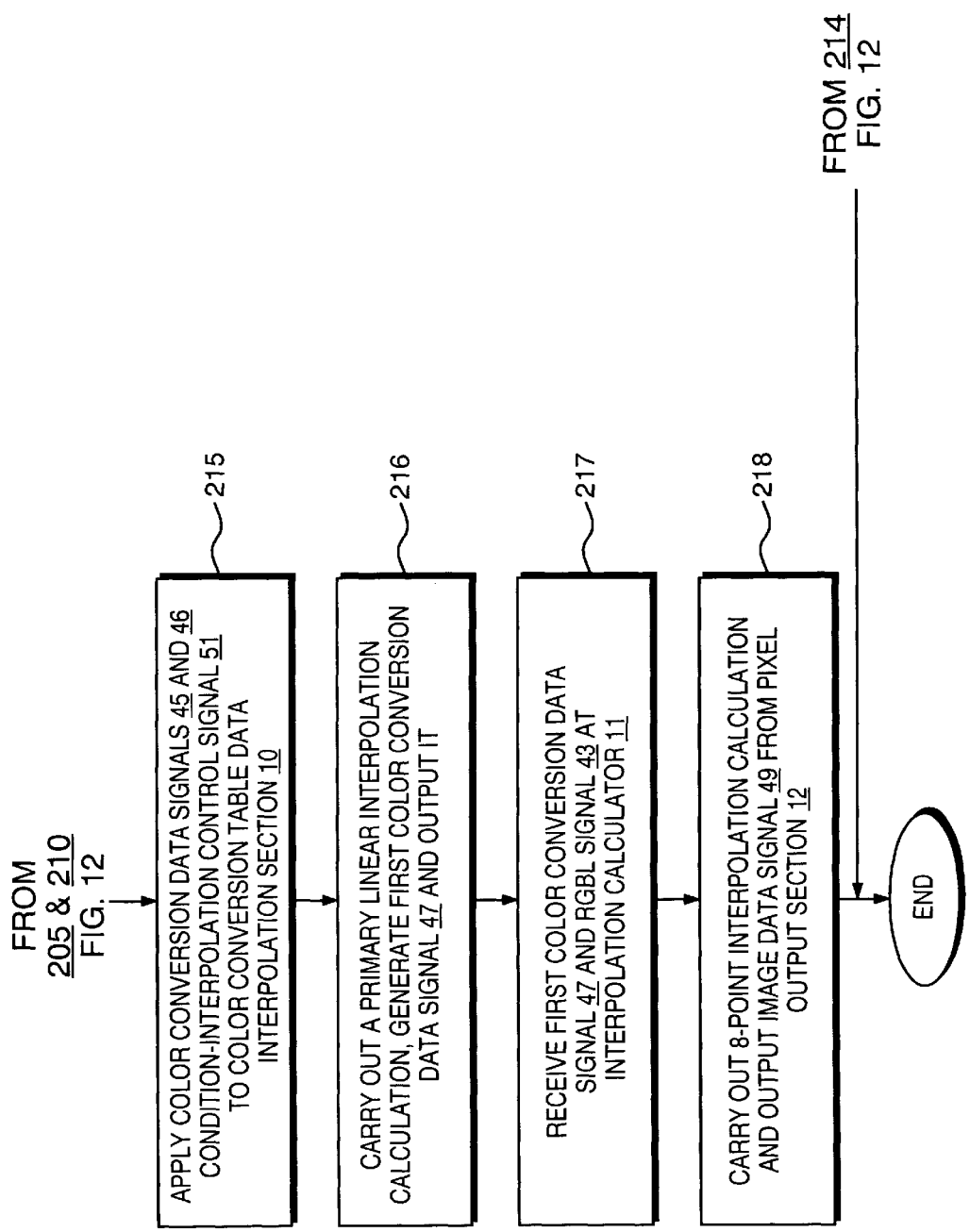
FIG. 13 shows a detailed flow chart of the operation of the first embodiment of the present invention.

The operation of this embodiment will next be explained in detail with reference to FIGS. 4, 12, and 13.

When operation of the color signal converter is started, RGB signal 40 is received at pixel input section 2 at step 200, and condition signal 41 is received at condition input section 7 at step 206. At step 201 RGBH signal 42 and RGBL signal 43 are separated from RGB signal 40 that has been received in pixel input section 2. RGBH signal 42 is applied at address converter 3 at step 202, and generates the address of color cube 18 that stores the color conversion data of first and second color conversion tables 4 and 5 from RGBH signal 42 at step 203.

The color cube unit 20 of first and second color conversion tables 4 and 5 that is designated at address converter 3 is next selected at step 204. The color conversion data 45 and 46 at each of the apices of color cube section 20 are read and supplied to color conversion table data interpolation section 10 as color conversion data signal at step 205.

At step 206, condition input signal 41 is received at condition input section 7, it is first determined at step 207 whether or not the external temperature is within the range, for example, from 10° C. to 70° C. If the change is within the range at step 208, condition signal 50 is generated at condition input section 7. Condition signal 50 generated at condition input section 7 is received by condition converter 8 at step 209, and condition-interpolation control signal 51 is generated at step 210. If the temperature change is not within the temperature range, it is then determined at step 211 whether or not the temperature change is less than 10° C. If the temperature change is less than 10° C., warm-up operation is performed at step 212. If the temperature change is not less than 10° C., it is next determined at step 213 whether or not the temperature is greater than 70° C. If the temperature change is greater than 70° C., printing is terminated at step 214. Color conversion data signals 45 and 46 and condition-interpolation control signal 51 are applied to color conversion table data interpolation section 10 at step 215, and a primary linear interpolation calculation is carried out for color conversion data signals 45 and 46 in accordance with condition-interpolation control signal 51 to generate first color conversion data signal 47 at step 216. First color conversion data signal 47 and RGBL signal 43 are received at interpolation calculator 11 at step 217, and carries out, for example, an 8-point interpolation calculation to output image data signal 49 to the outside from pixel output section 12.

As described in the foregoing explanation, color conversion data for low external temperature are stored in first color conversion table 4 and color conversion data for high external temperature are stored in second color conversion table 5. Accordingly, color reproduction is carried out with ink amounts after interpolation that exhibit a substantially linear increase with rising of external temperature.

If condition-interpolation is not executed according to the external temperature, prevention of deterioration in color reproducibility necessitates the provision of color conversion tables corresponding to each of the various external temperature, switching to the optimum color conversion table or rewriting data in color conversion tables should be made, comparing the color conversion data with external temperature. However, by providing first and second color conversion tables 4 and 5 that assume a particular range between the lowest temperature and the highest temperature as in the present embodiment, color conversion can be achieved by interpolating data outputted from first and second color conversion tables 4 and 5 according to the external temperature, thereby eliminating the need for operations for rewriting color conversion data and enabling good color reproduction without maintaining color conversion table data for all the various external temperature.

Figure 14:
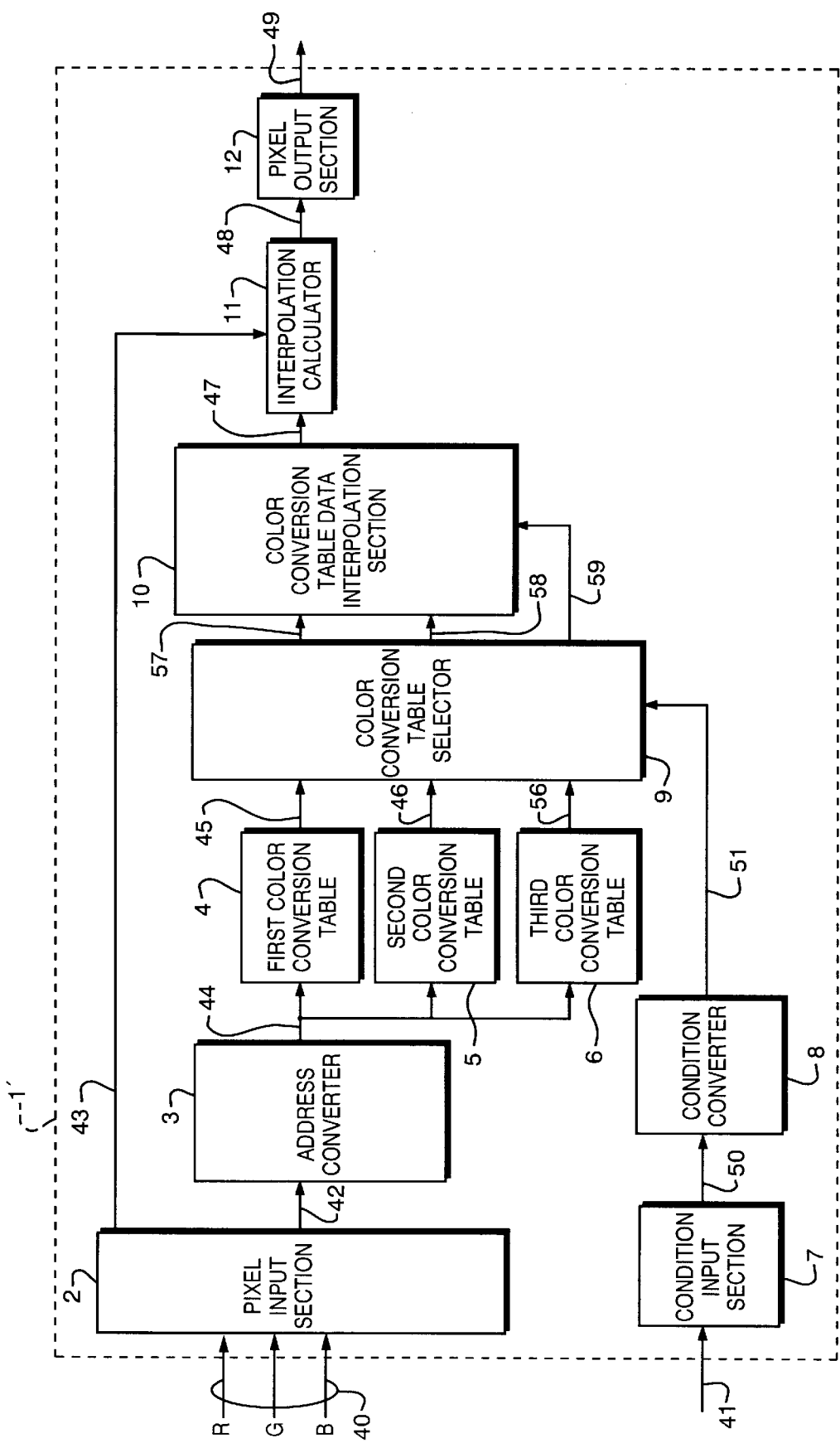
FIG. 14 shows a block diagram of the construction of a color signal converter according to a second embodiment of the present invention.

Referring now to FIG. 14, there is shown a color signal converter according to the second embodiment of the invention which comprises, in addition to the construction of the first embodiment shown in FIG. 4, third color conversion table 6 and data selector 9 which changes the processing of color conversion data interpolation section 10. The other construction of this embodiment is identical to that of the first embodiment, and explanation will be presented with constituent elements that are the same as those of FIG. 4 designated by the same reference numerals.

As shown in FIG. 14, this embodiment comprises pixel input section 2, address converter 3, first color conversion table 4, second color conversion table 5, third color conversion table 6, condition input section 7, condition converter B, color conversion data selector 9, color conversion table data interpolation section 10, interpolation calculator 11, and pixel output section 12.

Pixel input section 2 separates the two signals RGBH signal 42 and RGBL signal 43 from RGB signal 40. Address converter 3 generates address signals of first to third color conversion tables 4–6 from received RGB signal 40. First color conversion table 4 stores color conversion data for a low external temperature. Second color conversion table 5 stores color conversion data for a high external temperature. Third color conversion table 6 stores color conversion data for a temperature between a high external temperature and a low external temperature. Condition input section 7 receives condition signal 41, which is the external temperature, and outputs the signal as condition signal 50. Condition converter 8 generates, from condition signal 50 received from condition input section 7, condition-interpolation control signal 51 for interpolating in accordance with the external temperature; color conversion data selector 9 selects two color conversion data signals 57 and 58 from color conversion data signals 45, 46, and 56 outputted from first to third color conversion tables 4–6, receiving condition-interpolation control signal 51 received from condition converter 8, and generates and outputs condition-interpolation control signal 59 that corresponds to the selected color conversion data signals 57 and 58. Color conversion table data interpolation section 10 executes in accordance with condition-interpolation control signal 59, interpolation calculations of color conversion data signals 57 and 58 received from color conversion data selector 9 and generates first color conversion data signal 47 that corresponds to the current external temperature received from condition converter 8. Interpolation calculator 11 executes an interpolation calculation of first color conversion data signal 47 generated at color conversion table data interpolation section 10 in accordance with RGBL signal 43, which is a data signal for interpolation calculation separated at pixel input section 2. Pixel output section 12 outputs second color conversion data signal 48 from interpolation calculator 11 to the outside as image data signal 49.

This embodiment comprises third color conversion table 6 and color conversion data selector 9, and color conversion data of differing external temperature are stored in each of first to third color conversion tables 4–6.

Figure 15:
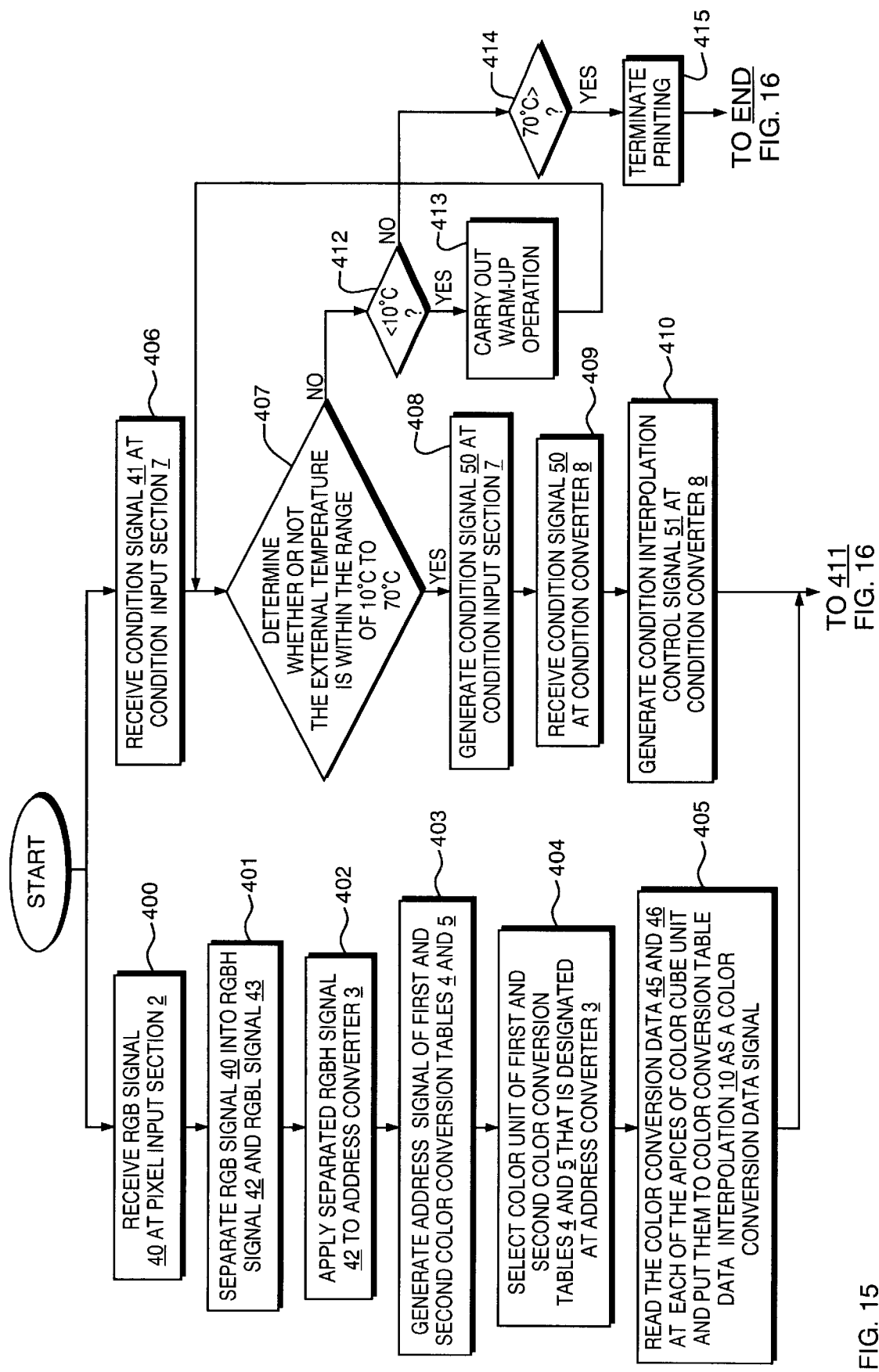
FIG. 15 shows a detailed flow chart of the operation of the second embodiment of the present invention.
Figure 16:
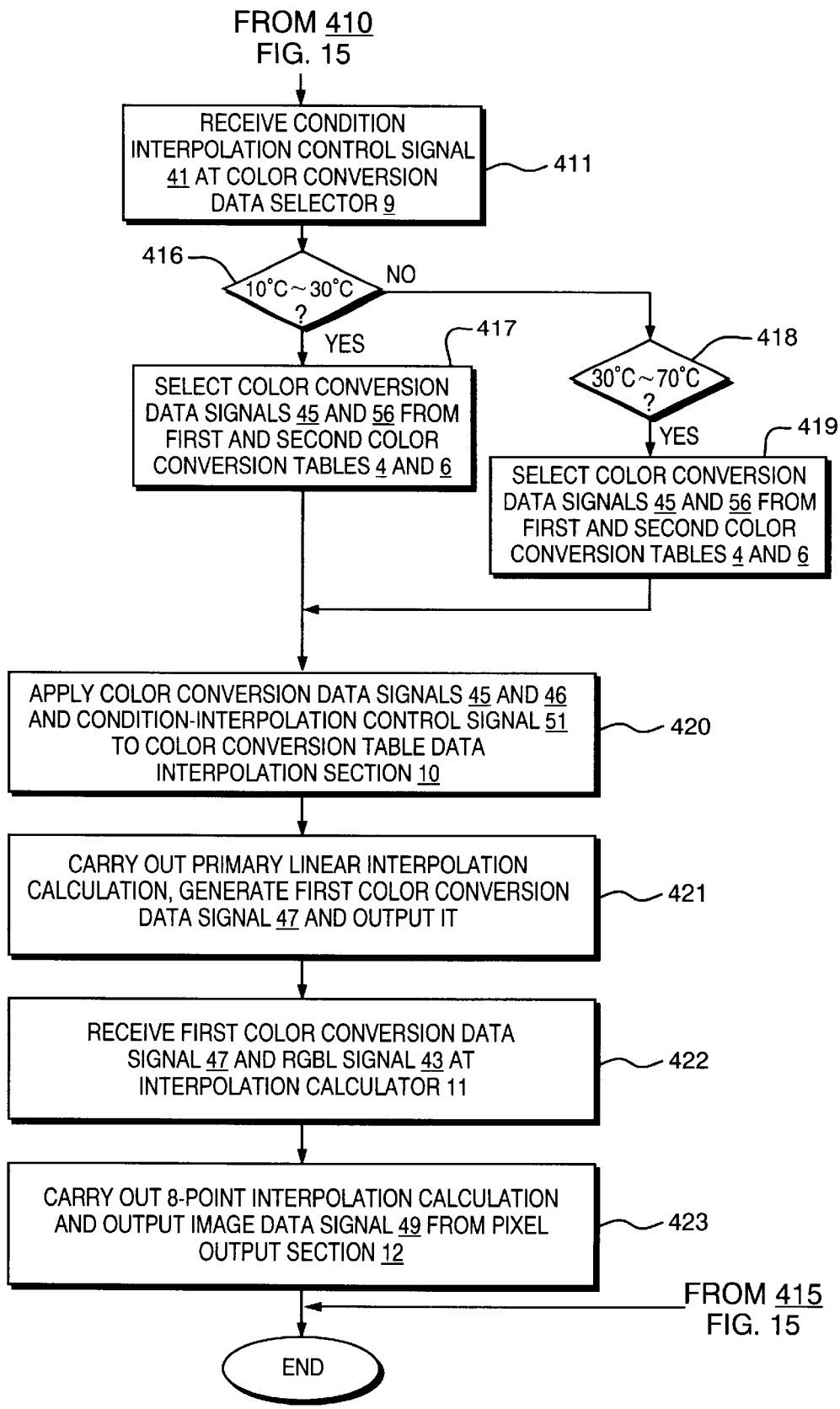
FIG. 16 shows a detailed flow chart of the operation of the second embodiment of the present invention.

The operation of this embodiment will next be explained with reference to FIGS. 14, 15, and 16.

When operation is started, RGB signal 40 is received at pixel input section 2 at step 400, and condition signal 41 is received at condition input section 7 at step 406. RGBH signal 42 that is applied to address converter 3 and RGBL signal 43 are separated from RGB signal 40 that has been received by pixel input section 2 at step 401. At step 402, RGBH signal 42 is received by address converter 3, and at step 403, the address of color cube 18 that stores the color conversion data of first and second color conversion tables 4 and 5 are generated from RGBH signal 42.

At step 404, the color cube unit 20 of first to third color conversion tables 4, 5, and 6 that are designated at address converter 3 is selected. The color conversion data at each of the apices of color cube unit 20 are read and supplied to color conversion data selector 9 as color conversion data signals 45, 46, and 56 at step 405.

Figure 17:
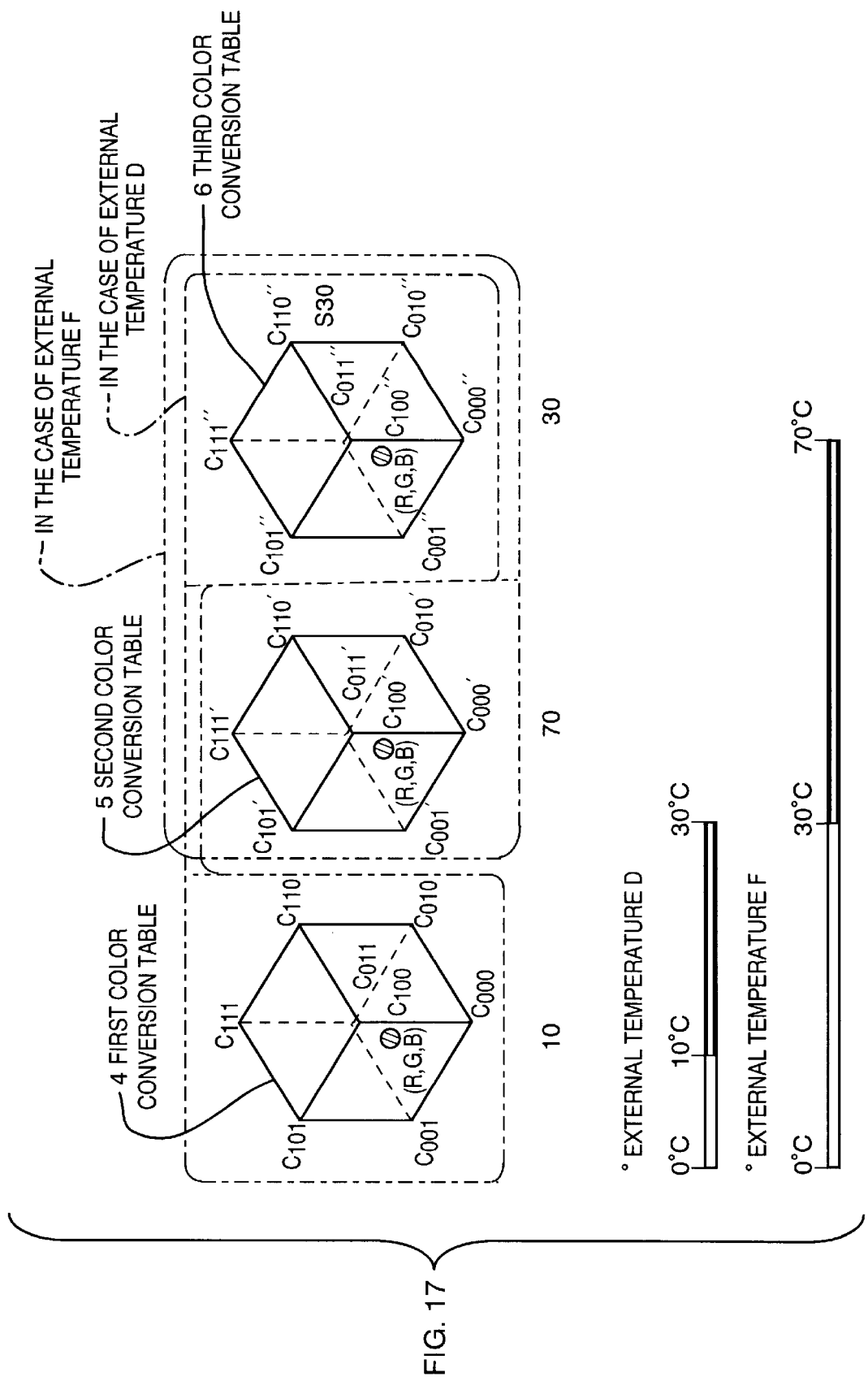
FIG. 17 shows the selection of a color conversion tables according to the external temperature.

At step 406, condition signal 41 is received by condition input section 7, it is first determined at step 407 whether or not the external temperature is within the range, for example, from 10° C. to 70° C., If the change is within this temperature range at step 408, condition signal 50 is generated at condition input section 7. Condition signal 50 generated at condition input section 7 is received by condition converter 8 at step 409, and condition-interpolation control signal 51 is generated at step 410. At step 411, condition-interpolation control signal 51 is received by color conversion data selector 9. If the temperature change is not within the temperature range, it is then determined at step 412 whether or not the temperature change is less than 10° C. If the temperature change is less than 10° C., warm-up operation is performed at step 413. If the temperature change is not less than 10° C., it is next determined at step 414 whether or not the temperature change is greater than 70° C. If the temperature change is greater than 70° C., printing is terminated at step 415. It is then determined at step 416 whether or not the temperature change in the external temperature is within the range of 10° C. to 30° C. of external temperature D as shown in FIG. 17. If the temperature range is within the temperature range, color conversion data signals 45 and 56 from first and third color conversion tables 4 and 6 are selected at step 417. If the temperature is not within the range, determination is next made as to whether the external temperature within the range of 30° C. to 70° C. of external temperature condition F at step 418. If the external temperature condition is within the temperature range, color conversion data signals 46 and 56 from second and third color conversion tables 5 and 6 are selected at step 419. If the external temperature is exactly 30° C., the calculation results will be the same whether the color conversion data of first and third color conversion tables 4 and 6 or the color conversion data of second and third color conversion tables 5 and 6 are used. Further, a combination of first and second color conversion table 4 and 5 is also be possible in accordance with external temperature conditions.

Selected color conversion data signals 57 and 58 and condition-interpolation control signal 59 that has been converted to correspond with the selected color conversion tables are at step 420 applied to color conversion table data interpolation section 10. Color conversion data signals 57 and 58 and condition-interpolation control signal 59 are received by color conversion table data interpolation section 10. Color conversion table data interpolation section 10 carries out, for example, a primary interpolation calculation and generates and outputs first color conversion data signal 47 at step 421. First color conversion data signal 47 and RGBL signal 43 that was separated from RGB signal 40 at pixel input section 2 are next received at interpolation calculator 11 at step 422. Interpolation calculator 11 carries out, for example, an 8-point interpolation calculation, generates second color conversion data signal 48, and outputs image data signal 49 to the outside from pixel output section 12 at step 423.

Figure 18A:
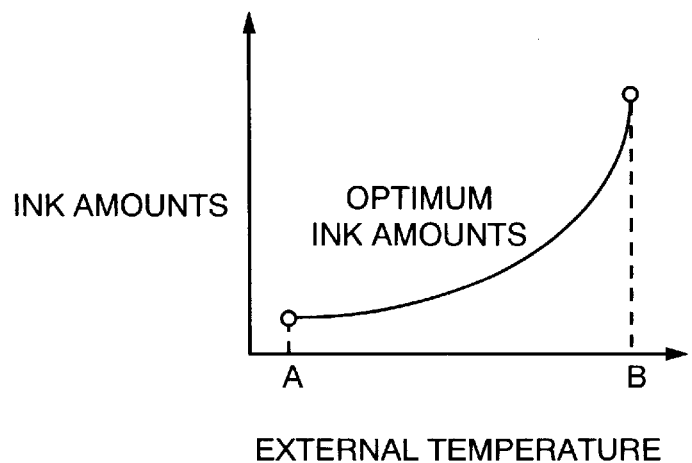
FIG. 18a shows optimum ink amounts when the external temperature are in the range of from A to B.
Figure 18B:
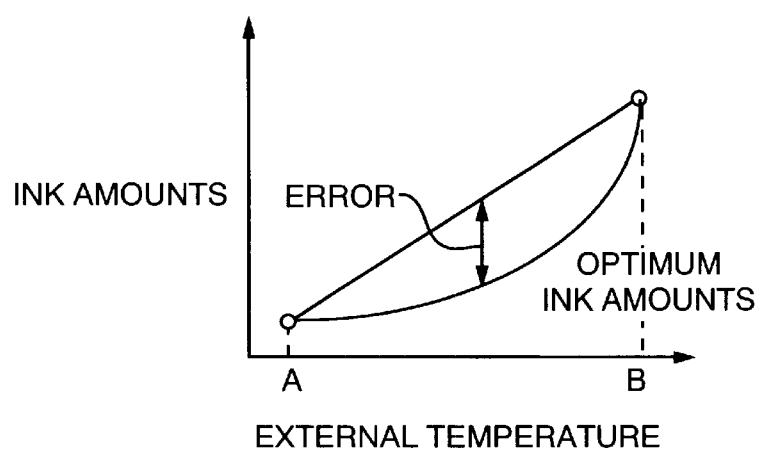
FIG. 18b shows the ink amounts after interpolation by the first embodiment.
Figure 18C:
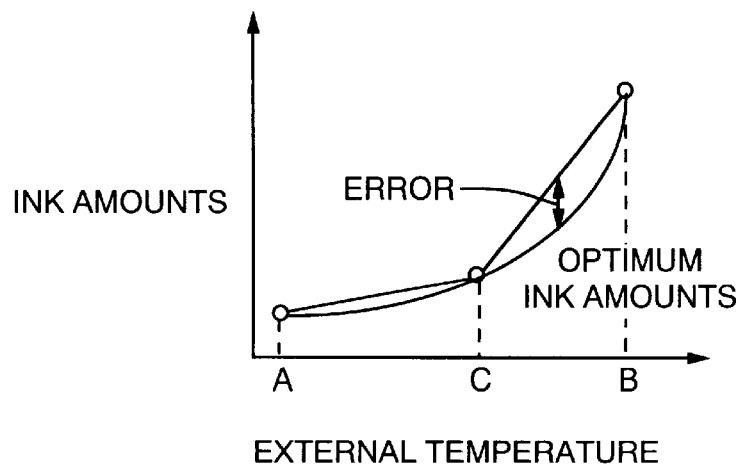
FIG. 18c shows the ink amounts after interpolation by the second embodiment.

FIG. 18a shows an optimum ink amount when the external temperature is within the range of A to B, FIG. 18b shows an ink amount after interpolation by the first embodiment, and FIG. 18c shows an ink amount after interpolation by the second embodiment.

In this embodiment, color conversion data for external temperature A are stored in first color conversion table 4, color conversion data for external temperature B are stored in second color conversion table 5, and color conversion data for an external temperature C between external temperature A and B are stored in third color conversion table 6; color conversion data selector 9 selects color conversion data signals 45 and 56 from first and third color conversion tables 4 and 6 and outputs these signals as color conversion data signals 57 and 58 when the external temperature is between A and C and in addition, outputs the position of condition-interpolation control signal 51 to color conversion table data interpolation section 10 as condition-interpolation control signal 59. Color conversion data selector 9 further selects color conversion data signals 46 and 56 from second and third color conversion tables 5 and 6 and outputs the selected signals as color conversion data signals 57 and 58 when the external temperature is between C and B and outputs the position of the value shown by condition-interpolation control signal 51 to color conversion table data interpolation section 10 as condition-interpolation control signal 59. The error between the optimum ink amount and the ink amount after interpolation can thus be decreased to a minimum.

To further improve the accuracy of approximation, the addition of color conversion tables for each external temperature is needed.

As described above, when optimum ink amounts required for reproducing a particular specific color exhibit a nonlinear change due to external temperature, the color reproduction according to this embodiment allows a closer approximation of ink amounts after interpolating optimum ink amounts than the first embodiment shown in FIG. 18b by storing color conversion data for a low external temperature in first color conversion table 4, color conversion data for a high external temperature in second color conversion table 5, and color conversion data for a temperature between the high and low external temperatures in third color conversion table 6, as can be seen from FIG. 18c.

If condition-interpolation is not carried out according to external temperatures, the prevention of deterioration in color reproducibility necessitates the provision of color conversion tables corresponding to various temperatures and then comparing external temperature and switching to a color conversion table that is ideal for the current external temperature condition or rewriting data in color conversion tables. However, by providing first to third color conversion tables 4–6 established on the assumption of a particular range between the lowest temperature and the highest as well as an intermediate temperature range between the lowest and highest temperatures as in the present embodiment, color conversion can be carried out by constantly interpolating between the color conversion tables according to the external temperature, thereby eliminating the need for rewriting operations as well as allowing good color reproduction to be achieved without maintaining color conversion table data for various conditions.

In addition, apart from the inability to automate color conversion, the first embodiment can take the same effect as the second embodiment by rewriting color conversion data in first and second color conversion tables 4 and 5 from the outside with external temperature C of FIG. 18c as boundary.

Although certain preferred embodiments of the present invention have been shown and described in detail, it should be understood that various changes and modifications may be made without departing from the scope of the present invention.

What is claimed is:

1. A color signal converter comprising:
   a condition converter that generates a condition interpolation control signal indicating an external condition;
   first and second color conversion tables for storing color conversion data corresponding to different external conditions; and
   a color conversion table data interpolation section for carrying out interpolation of color conversion data from each of said first and second color conversion tables in accordance with said condition interpolation control signal and generating a color conversion data signal for generating an image that corresponds to said external conditions.

2. The color signal converter of claim 1, wherein said external condition is one of: temperature, air pressure and humidity.

3. The color signal converter of claim 2, wherein said first color conversion table includes data corresponding to a low external temperature and said second color conversion table includes data corresponding to a high external temperature and said condition interpolation control signal indicates an external temperature that is within a range of values bounded by said low external temperature and said high external temperature.

4. The color signal converter of claim 3, wherein said color conversion table data interpolation section performs an interpolation of a first value obtained from said first color conversion table and a second value obtained from said second color conversion table, values changing linearly within said range.

5. The color signal converter of claim 4, wherein said color conversion table data interpolation section performs a cubic interpolation calculation.

6. The color signal converter of claim 1, wherein said first color conversion table includes data corresponding to a lower bound of a selected external condition and said second color conversion table includes data corresponding to an upper bound of said selected external condition, said color conversion table data interpolation section including:
   a subtraction circuit that outputs a differential data signal indicating how said condition interpolation control signal deviates from said upper bound;
   a first multiplication circuit that outputs a first multiplication signal of said condition interpolation control signal multiplied by a first value selected from said first color conversion table;
   a second multiplication circuit that outputs a second multiplication signal of said differential data signal multiplied by a second value selected from said second color conversion table;
   an adder that produces an adder output signal of said first multiplication signal added to said second multiplication signal; and
   a divider that produces a divider output signal by dividing said adder output signal by a value corresponding to a difference between said upper bound and said lower bound.

7. The color signal converter of claim 6, further comprising:
   an interpolation calculator that performs interpolation using said divider output signal and a portion of low order bits of an input signal.

8. The color signal converter of claim 7, wherein an element of said first and second color conversion tables is referenced by another portion of high order bits of said input signal.

9. The color signal conversion method of claim 8, wherein said first color conversion data includes data corresponding to a lower bound of a selected external condition and said second color conversion data includes data corresponding to an upper bound of said selected external condition, and said method further comprising:
   producing a differential data signal indicating how said condition interpolation control signal deviates from said upper bound;
   producing a first multiplication signal of said condition interpolation control signal multiplied by a first value selected from said first color conversion table;
   producing a second multiplication signal of said differential data signal multiplied by a second value selected from said second color conversion table;
   producing an adder output signal of said first multiplication signal added to said second multiplication signal; and
   producing a divider output signal by dividing said adder output signal by a value corresponding to a difference between said upper bound and said lower bound.

10. The color signal conversion method of claim 9, further comprising:
    performing interpolation using said divider output signal and a portion of low order bits of an input signal.

11. The color signal conversion method of claim 10, wherein an element of said first and second color conversion data is referenced by another portion of high order bits of said input signal.

12. A color signal converter according to claim 1, wherein color conversion data stored in said first and second color conversion tables are color conversion data for converting from RGB, which are the three primary colors of light, to CMY, which are the three primary colors of color.

13. A color signal converter according to claim 1, wherein said color conversion table data interpolation section includes means for carrying out an interpolation calculation of color conversion data outputted from said first and second color conversion tables in accordance with said external conditions, and for generating color conversion data signals corresponding to said color conversion data.

14. A color signal conversion method comprising the steps of:
    receiving a condition interpolation control signal indicating an external condition;
    receiving first and second color conversion data that correspond to different external conditions;
    carrying out interpolation of said received color conversion data in response to said condition interpolation control signal; and
    generating color conversion data signals for image generation that correspond to said external conditions.

15. The color signal conversion method of claim 14, wherein said external condition is one of: temperature, air pressure and humidity.

16. The color signal conversion method of claim 15, wherein said first color conversion data includes data corresponding to a low external temperature and said second color conversion data includes data corresponding to a high external temperature and said condition interpolation control signal indicates an external temperature that is within a range of values bounded by said low external temperature and said high external temperature.

17. The color signal conversion method of claim 16, further comprising:

performing an interpolation of a first value obtained from said first color conversion table and a second value obtained from said second color conversion table, wherein values within said range vary linearly.

18. The color signal conversion method of claim 17, further comprising:

performing a cubic interpolation calculation.

19. A color signal converter comprising:

first to third color conversion tables for storing color conversion data corresponding to different external conditions;

a color conversion data selector for selecting and outputting, according to external conditions, two color conversion data signals from three color conversion data signals outputted from said first to third color conversion tables, and for converting said external conditions according to the two selected color conversion data signals and outputting the result; and a color conversion table data interpolation section for carrying out interpolation based on said external conditions and the two color conversion data signals outputted from said color conversion data selector, and for generating color conversion data signals for image generation that correspond to said external conditions.

20. A color signal converter according to claim 19, wherein said first color conversion table stores color conversion data when said external conditions are low, said second color conversion table stores color conversion data when said external conditions are high, and said third color conversion table stores color conversion data when said external conditions are between high and low.

21. A color signal converter according to claim 19, wherein color conversion data stored in said first to third color conversion tables are color conversion data for converting from RGB, which are the three primary colors of light, to CMY, which are the three primary colors of color.

22. A color signal converter according to claim 19, wherein said color conversion data selector includes means for selecting first and third color conversion tables when said external conditions are between first color conversion data stored in said first color conversion table and second color conversion data stored in said third color conversion table, and for selecting said second and third color conversion tables when said external conditions are between third color conversion data stored in said second color conversion table and second color conversion data stored in said third color conversion table.

23. A color signal conversion method comprising the steps of:

receiving external conditions and first to third color conversion data that correspond to different external conditions;

selecting two color conversion data signals from among said received first to third color conversion data signals based on said received first to third color conversion data signals and external conditions;

converting said external conditions according to the two selected color conversion data signals;

carrying out interpolation based on said color conversion data and external conditions; and generating color conversion data signals that correspond to said external conditions.

* * * * *